(12) United States Patent
Chen et al.

(10) Patent No.: US 12,689,775 B2
(45) Date of Patent: Jul. 21, 2026

(54) SYSTEMS AND METHODS FOR REDUCING LATENCY IN VIDEO STREAMING

(71) Applicant: Adeia Guides Inc., San Jose, CA (US)

(72) Inventors: Tao Chen, Palo Alto, CA (US); Christopher Phillips, Hartwell, GA (US)

(73) Assignee: Adeia Guides Inc., San Jose, CA (US)

( * ) Notice: Subject to any disclaimer, the term of this patent is extended or adjusted under 35 U.S.C. 154(b) by 213 days.

(21) Appl. No.: 18/664,481

(22) Filed: May 15, 2024

(65) Prior Publication Data

US 2025/0358459 A1     Nov. 20, 2025

(51) Int. Cl.
| | |
|---|---|
| *H04N 21/2187* | (2011.01) |
| *H04N 19/119* | (2014.01) |
| *H04N 19/136* | (2014.01) |
| *H04N 19/177* | (2014.01) |
| *H04N 19/184* | (2014.01) |

(52) U.S. Cl.
CPC ....... *H04N 21/2187* (2013.01); *H04N 19/119* (2014.11); *H04N 19/136* (2014.11); *H04N 19/177* (2014.11); *H04N 19/184* (2014.11)

(58) Field of Classification Search
CPC ............. H04N 21/2187; H04N 19/119; H04N 19/136; H04N 19/177; H04N 19/184
See application file for complete search history.

(56) References Cited

U.S. PATENT DOCUMENTS

| | | | | |
|---|---|---|---|---|
| 10,880,585 | B1 * | 12/2020 | Waggoner | .............. H04N 19/64 |
| 11,546,401 | B2 * | 1/2023 | Amirpour | .............. H04L 65/80 |
| 11,695,815 | B1 * | 7/2023 | Mekuria | ................. H04L 65/70 |
| | | | | 709/231 |
| 2018/0176278 | A1 * | 6/2018 | Mandyam | ............... H04L 65/70 |
| 2021/0099739 | A1 * | 4/2021 | Weil | ................. H04N 21/23439 |

OTHER PUBLICATIONS

Bejerano, Y., et al., "Improving Zap Response Time for IPTV", IEEE Infocom 2009, Jun. 2, 2009, pp. 1971-1979.
Enabling Low-Latency HTTP Live Streaming (HLS), HTTP Live Streaming, available online at: <https://developer.apple.com/documentation/http-live-streaming/enabling-low-latency-http-live-streaming-hls>, retrieved on Jun. 13, 2024, 11 pages.

(Continued)

*Primary Examiner* — Oschta I Montoya
(74) *Attorney, Agent, or Firm* — HG LAW LLP

(57) ABSTRACT

Systems and methods are provided for reducing latency in video streaming. At least a first portion of a live content item is encoded, using a first encoder, into a first bitstream, which is packaged into a first plurality of segments that start at a first time in the live content item. An offset is determined. At least a second portion of the live content item is encoded, using a second encoder, into a second bitstream, which is packaged into a second plurality of segments that start at a second time in the live content item, where the second time is based on the offset and is after the first time. Each segment of the first and second plurality of segments starts with an instantaneous decoder refresh frame, and each segment at a corresponding position in the first and second plurality of segments comprises a group of pictures.

20 Claims, 16 Drawing Sheets

(56) References Cited

OTHER PUBLICATIONS

Federico Chiariotti, "A survey on 360-degree video: Coding, quality of experience and streaming", Computer Communications, vol. 177, Sep. 2021, pp. 133-155.
Hannuksela, M. M., et al., "An Overview of the OMAF Standard for 360° Video," IEEE Data Compression Conference (DCC), Mar. 26-29, 2019, pp. 418-427.
Shen, G., et al., "An Optimal SVC Bitstream Schema for Viewport-Dependent 360-Degree Video Streaming", 2023 9th International Conference on Virtual Reality (ICVR), 2023, 8 pages.
Theoplayer, "Low Latency with Chunked CMAF", THEO Blog, available online at: <https://www.theoplayer.com/blog/low-latency-chunked-cmaf>, Jun. 13, 2024, 6 pages.
Zhiyu Pang, "VATP360: Viewport Adaptive 360-Degree Video Streaming based on Tile Priority," Journal of Latex Class Files, vol. 14, No. 8, Aug. 2021, 9 pages.

* cited by examiner

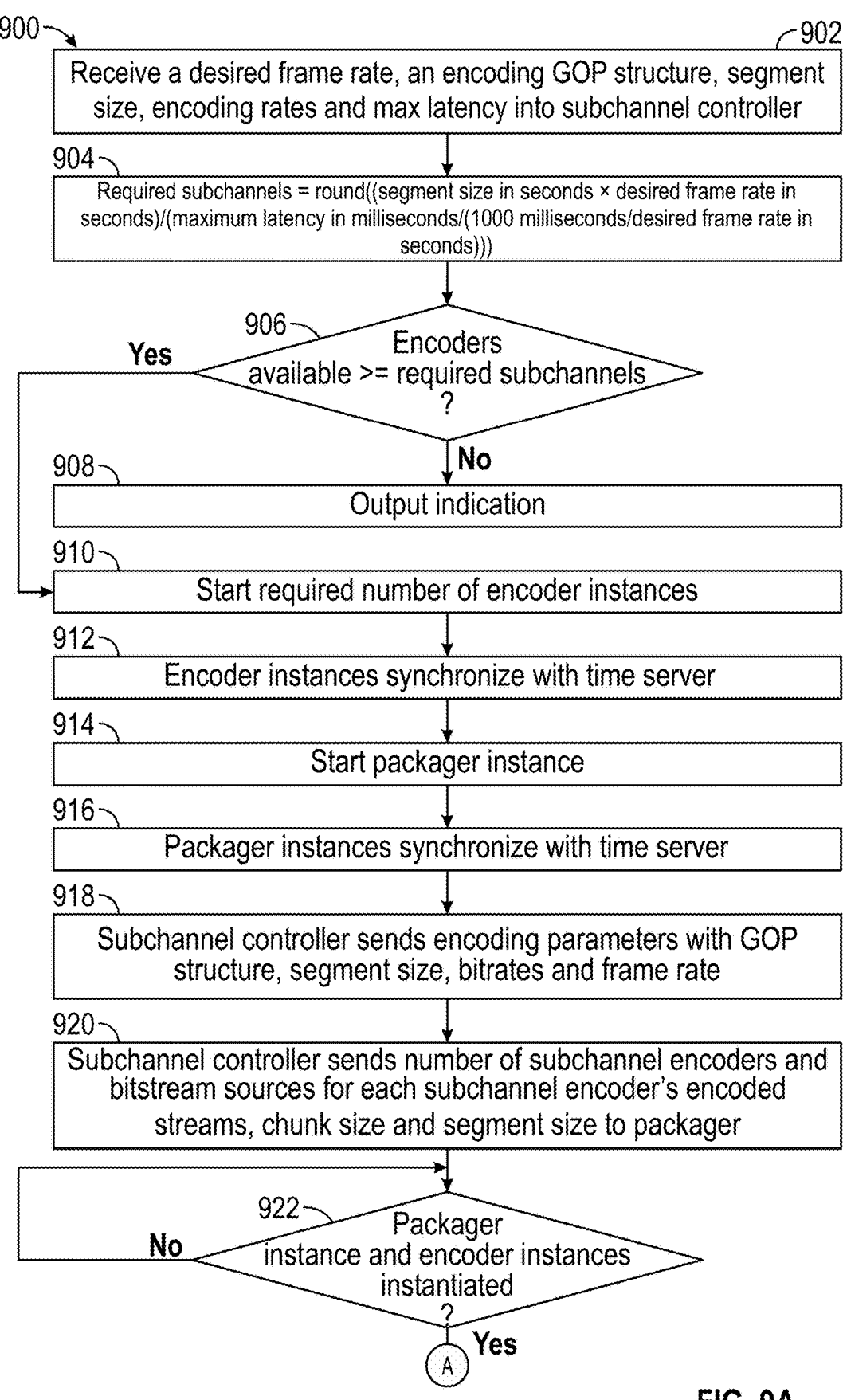

900

902

Receive a desired frame rate, an encoding GOP structure, segment size, encoding rates and max latency into subchannel controller

904

Required subchannels = round((segment size in seconds × desired frame rate in seconds)/(maximum latency in milliseconds/(1000 milliseconds/desired frame rate in seconds)))

906

Encoders available >= required subchannels ?

Yes

No

908

Output indication

910

Start required number of encoder instances

912

Encoder instances synchronize with time server

914

Start packager instance

916

Packager instances synchronize with time server

918

Subchannel controller sends encoding parameters with GOP structure, segment size, bitrates and frame rate

920

Subchannel controller sends number of subchannel encoders and bitstream sources for each subchannel encoder's encoded streams, chunk size and segment size to packager

922

Packager instance and encoder instances instantiated ?

No

A

Yes

FIG. 9A

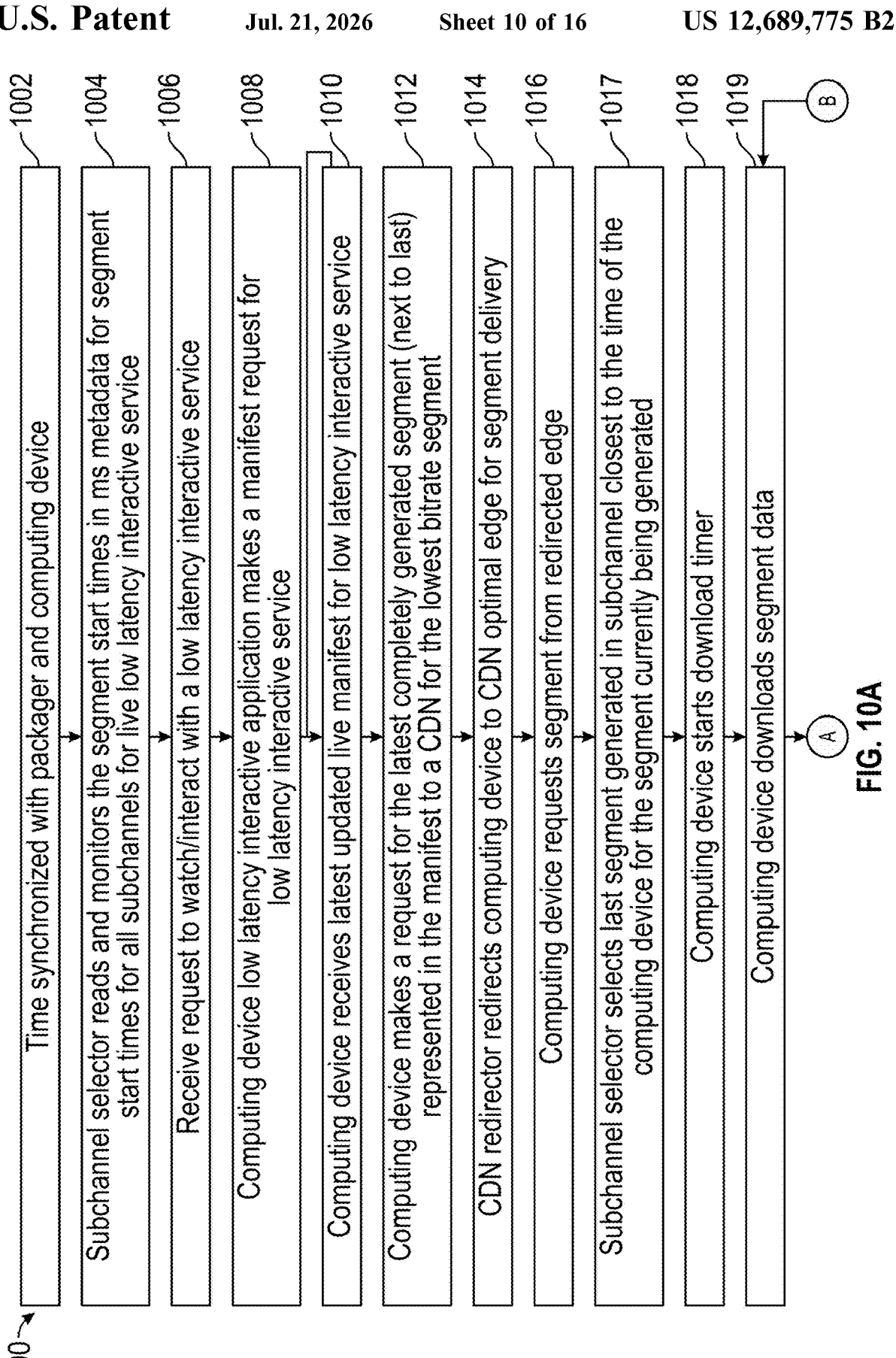

1002 — Time synchronized with packager and computing device

1004 — Subchannel selector reads and monitors the segment start times in ms metadata for segment start times for all subchannels for live low latency interactive service 1006 — Receive request to watch/interact with a low latency interactive service 1008 — Computing device low latency interactive application makes a manifest request for low latency interactive service 1010 — Computing device receives latest updated live manifest for low latency interactive service 1012 — Computing device makes a request for the latest completely generated segment (next to last) represented in the manifest to a CDN for the lowest bitrate segment 1014 — CDN redirector redirects computing device to CDN optimal edge for segment delivery 1016 — Computing device requests segment from redirected edge 1017 — Subchannel selector selects last segment generated in subchannel closest to the time of the computing device for the segment currently being generated 1018 — Computing device starts download timer 1019 — Computing device downloads segment data

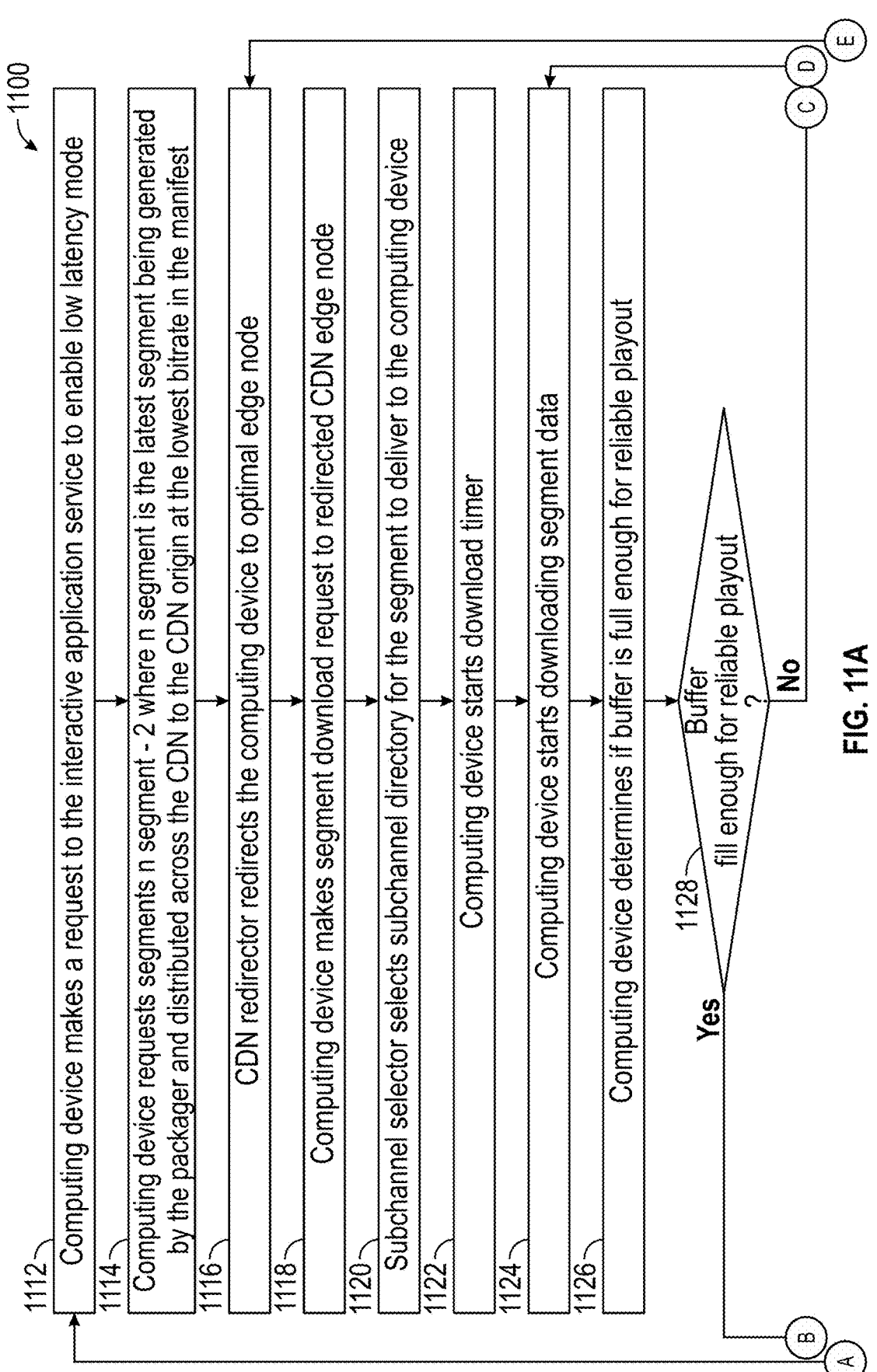

1100

1112 — Computing device makes a request to the interactive application service to enable low latency mode 1114 — Computing device requests segments n segment - 2 where n segment is the latest segment being generated by the packager and distributed across the CDN to the CDN origin at the lowest bitrate in the manifest 1116 — CDN redirector redirects the computing device to optimal edge node 1118 — Computing device makes segment download request to redirected CDN edge node 1120 — Subchannel selector selects subchannel directory for the segment to deliver to the computing device 1122 — Computing device starts download timer 1124 — Computing device starts downloading segment data 1126 — Computing device determines if buffer is full enough for reliable playout 1128 — Buffer fill enough for reliable playout ?

Yes

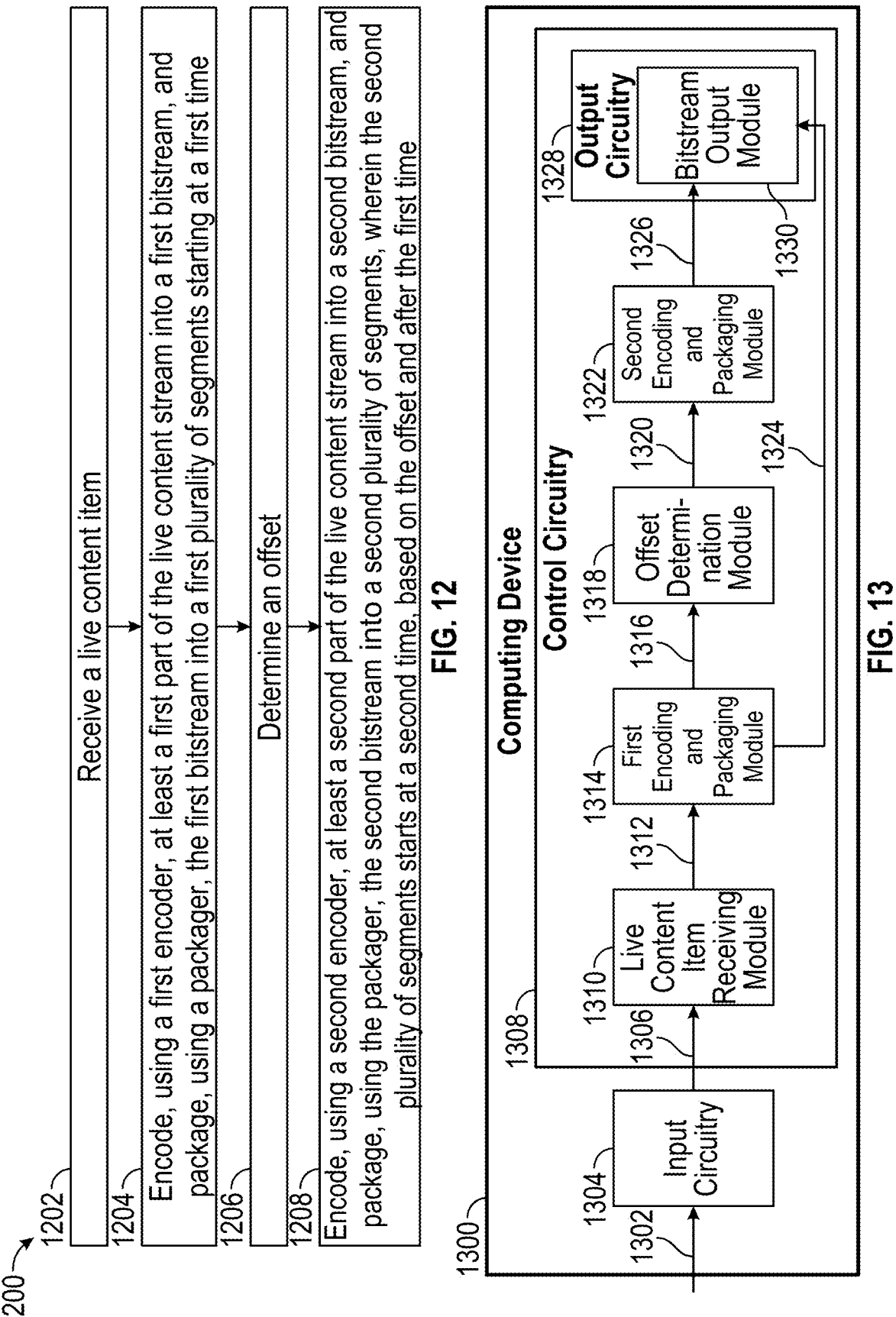

1200

1202 Receive a live content item

1204 Encode, using a first encoder, at least a first part of the live content stream into a first bitstream, and package, using a packager, the first bitstream into a first plurality of segments starting at a first time 1206 Determine an offset 1208 Encode, using a second encoder, at least a second part of the live content stream into a second bitstream, and package, using the packager, the second bitstream into a second plurality of segments, wherein the second plurality of segments starts at a second time, based on the offset and after the first time

FIG. 12

Computing Device 1300

Input Circuitry 1302

1304

1306

Control Circuitry 1308

Live Content Item Receiving Module 1310

1312

First Encoding and Packaging Module 1314

1316

Offset Determination Module 1318

1320

1324

Second Encoding and Packaging Module 1322

1326

Output Circuitry 1328

Bitstream Output Module

SYSTEMS AND METHODS FOR REDUCING LATENCY IN VIDEO STREAMING

The present disclosure is generally directed to systems and methods for reducing latency in video streaming.

SUMMARY

Delivering live content items, such as live sports events, to computing devices, such as smart televisions, smartphones, tablets, and other computing devices that can receive, via the internet using an adaptive bitrate (ABR) protocol. ABR content delivery, such as streaming, enables the delivery of content items in a manner that responds to network conditions, and device processing capacity, by varying the quality of the delivered content item. An encoder, typically server-based, encodes a source content item media at multiple bitrates. A player, running on a local computing device, switches between requesting the different encodings based on the device and network heuristics. In ABR streaming, a content item is not a single stream of data, rather it is many small segments of the content item comprising individual files. A player running on the computing device requests, downloads and buffers segments at a calculated bitrate based on the segment downloads. The player demultiplexes, decodes and renders the downloaded segments. Where there is high latency and/or a lossy network, encoding the video in longer segments may improve a user experience, e.g., by encoding the video in segments that are two seconds in length and buffering three to four segments in the player. ABR protocols such as dynamic adaptive streaming over HTTP (DASH) and/or HTTP live streaming (HLS) prioritize reliability at the expense of latency. In some examples, prioritizing reliability at the expense of latency may be less suitable for streaming live or latency-sensitive content. Attempts have been made to address some of the latency issues with respect to using ABR formats by using alternative protocols such as Web Real-Time Communication (WebRTC). In some examples, WebRTC may provide a minimal latency of less than one second; however, WebRTC uses a non-reliable, best-effort user datagram protocol (UDP) network connection, which is not suitable for delivering live premium content, e.g., in sports events and sports betting.

To help address these problems, systems and methods are provided for reducing latency in video streaming.

In accordance with some aspects of the disclosure, a method is provided that includes receiving a live content item at a computing device and encoding at least a first portion of the live content item into a first bitstream using an encoder. A packager packages the first bitstream into a first plurality of segments. The first segment of the first plurality of segments starts at a first time in the live content item, and an offset is determined based on a predefined factor. A second encoder is used to encode at least a second portion of the live content item using a second encoder into a second bitstream. The packager packages the second bitstream into a second plurality of segments. Each segment of the first plurality of segments and the second plurality of segments starts with an instantaneous decoder refresh frame, and each segment at a corresponding position in the first plurality of segments and the second plurality of segments comprises a group of pictures (GOP). The first segment of the second plurality of segments starts at a second time in the live content item, where the second time is based on the offset and is after the first time.

In some examples, a video is encoded by an encoder into a defined GOP structure, and the segment size may be specified, for example, by a user, and the segment size does not have to be equal to the GOP size. In an example, an encoder may be set up to produce two-second GOPs, and the segment size is two seconds. The packager may be set up to produce two-second segments, or segments of multiples of two seconds, for example, four, six, eight and ten second segments. In some examples, a packager may create segments, such as Common Media Application Format (CMAF) compliant multiplexed segments, from the first and/or second encoders.

In an example system, a server receives a live stream of a baseball game. At the server, a first encoder encodes at least a first part of the baseball game into a first bitstream, and a packager packages the first bitstream into a first plurality of segments. The first segment of the first plurality of segments starts at a first time in the live content item, and, in this example, an offset is determined based on the segment size and the number of encoders. In this example, the segment size is one second and there are two encoders, which leads to an offset of 0.5 seconds. At the server, a second encoder encodes at least a second portion of the live content item into a second bitstream, and a packager packages the second bitstream into a second plurality of segments. Each segment of the first plurality of segments and the second plurality of segments starts with an instantaneous decoder refresh frame, and each segment at a corresponding position in the first plurality of segments and the second plurality of segments comprises a GOP. The first segment of the second plurality of segments starts at a second time in the live content item, where the second time is based on the offset and is after the first time. If a player running on a, for example, smart phone, requests the live stream of the baseball game, the player picks and requests the bitstream that would give rise to the lowest latency (i.e., the bitstream having the soonest start of a segment).

BRIEF DESCRIPTIONS OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

The above and other objects and advantages of the disclosure may be apparent upon consideration of the following detailed description, taken in conjunction with the accompanying drawings, in which:

FIGS. 9A-9B show a flowchart of illustrative steps for enabling reduced latency in video streaming, in accordance with some embodiments of the disclosure;

FIGS. 10A-10C show another flowchart of illustrative steps for enabling reduced latency in video streaming, in accordance with some embodiments of the disclosure;

FIGS. 11A-11C show another flowchart of illustrative steps for enabling reduced latency in video streaming, in accordance with some embodiments of the disclosure;

FIG. 12 shows another flowchart of illustrative steps for enabling reduced latency in video streaming, in accordance with some embodiments of the disclosure; and FIG. 13 shows a block diagram representing components of a computing device and dataflow therebetween for enabling reduced latency in video streaming, in accordance with some embodiments of the disclosure.

DETAILED DESCRIPTION

Figures 1, 2:
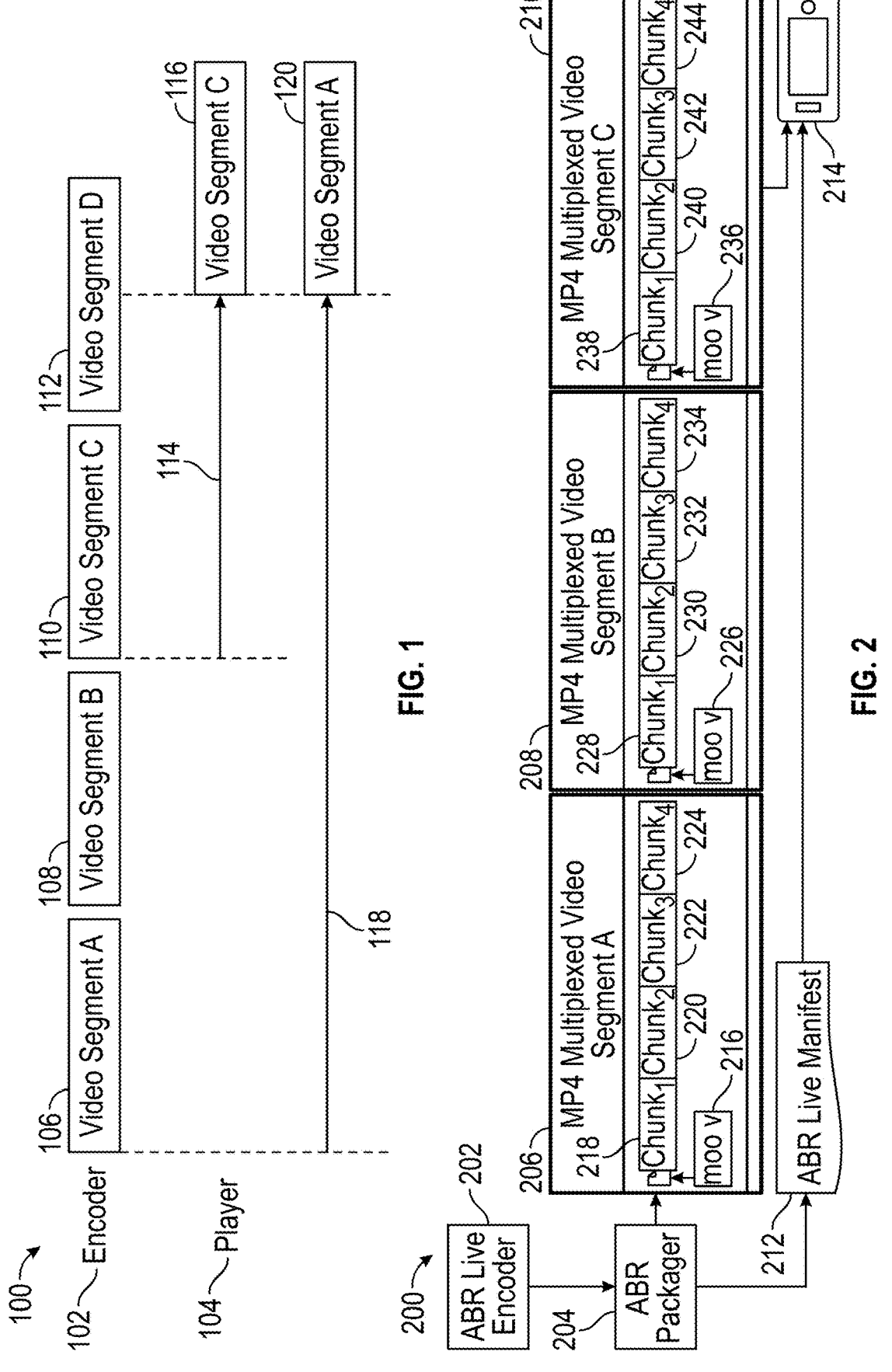
FIG. 1 shows an example timeline of ABR streaming video segments.
FIG. 2 shows an example timeline of fragmented transfer encoding.

A content item includes audio, video, text, a video game and/or any other media content. A live content item is a content item that is broadcast at the same time, or at substantially the same time, as an event that is being captured for broadcast. A content item may be a single media item. In other examples, it may be a series (or season) of episodes of content items. Video includes audiovisual content such as movies and/or television programs or portions thereof. Audio includes audio-only content, such as podcasts or portions thereof. Text includes text-only content, such as event descriptions or portions thereof.

Content items that are delivered via ABR streaming may be delivered via DASH or HLS. Content items that are delivered in this manner may be made available in short media segments at different qualities (bitrates), and a receiving computing device can optimize a consumption experience by matching the quality of audio and/or video against fluctuating network conditions and/or computing loads. Streaming content, in particular content such as videos, to and from mobile devices faces several challenges, such as unstable wireless connections, limited throughput, long latency, and/or high jitter. HTTP adaptive streaming, video transcoding, and/or adaptive encoding may be used to address these challenges in mobile content streaming.

Typically, the output from an encoder is transmitted to a packager, where the output of the encoder is packaged in order to create one or more segments. Each encoder, such as an ABR encoder, as discussed herein may produce a plurality of bitstreams of different bitrates and/or resolutions; these may get fed into a packager, which produces a plurality of segments with those characteristics, writes them to a manifest file and publishes the manifest file to a, for example, content delivery network (CDN) server or manifest server. A computing device, such as a client computing device, can utilize a manifest file to request one or more desired segments. In some examples, the number of bitstreams out of an encoder may be predetermined, for example, based on an encoding template defined by a service and/or an admin user.

The disclosed methods and systems may be implemented on one or more devices, such as user devices and/or computing devices. As referred to herein, the device can be any device comprising a processor and memory, for example, a handheld computer, a mobile telephone, a portable video player, a portable music player, a portable gaming machine, a smartphone, a smartwatch, a smart speaker, an augmented reality headset, a mixed reality device, a virtual reality device, a gaming console, a vehicle infotainment headend or any other computing equipment, wireless device, and/or combination of the same.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, USB drive, DVD, CD, media cards, register memory, processor caches, random access memory (RAM) and/or a solid-state drive.

FIG. 1 shows an example timeline of ABR streaming video segments, highlighting how ABR can introduce latency into a live video stream. The environment 100 comprises an encoder 102 and a player 104. In some examples, the output from the encoder 102 may be transmitted to a packager (not shown) for producing segments, such as CMAF compliant segments. In one example, the encoder 102 runs on a first computing device, such as a server, and the player 104 runs on a second computing device, such as a smartphone, laptop or smart television. The first and second computing devices may be remote from one another, and may communicate via a network such as the internet. The encoder receives a content item, such as a live video stream of a sporting event, and encodes the live video stream. A plurality of video segments 106, 108, 110, 112, are generated from the encoded live video stream, for example, by a packager. In response to a user input requesting the live video stream, the video player 104 requests one or more segments. The video player 104 receives the requested segments and generates them for output at the second computing device. In a first example, each of the video segments 106, 108, 110, 112 is two seconds long, and the request for the live video stream is received halfway through video segment D 112. As video segment D 112 has not finished encoding, video segment C 110 is requested, which introduces a latency 114 of three seconds with respect to the live video stream. The three seconds comprises the two seconds of video segment C 110 and half of video segment D 112 (i.e., one second). In a second example, the player 104 requires a buffer of three video segments to help enable smooth playback (i.e., without buffering). In this second example, video segment A 106 is requested to give the buffer of three video segments, which introduces a latency 118 of seven seconds with respect to the live video stream. The seven seconds comprises the three video segments A-C 106, 108, 110, each being two seconds long, and half of video segment D 112 (i.e., one second).

The CMAF is an example of an ABR packaging construct. It aims to address the inefficiencies inherent in ABR delivery and to enable a natively supported low latency. DASH supports both MPEG-2 transport stream (MP2TS) and MPEG-4 (MP4) multiplexed containers. MP4 containers require the downloading of an entire stream segment before playout can start, because critical movie box (moov) atom and other required container data are at the end of the file. A packager must complete the multiplexing of a segment before it can be delivered to a player running on a computing device as the critical data is stored at the end of the MP4 container, and the player must download a complete segment before playback can begin, which introduces significant latency before playback can begin. The CMAF format enables movie fragment (moof) boxes to be distributed throughout a segment, including, for example, down to every frame. The moof box includes all data necessary to demultiplex a subset (e.g., a movie fragment) of data. This enables a player to begin playback immediately after receiving a moof box, giving a similar behavior to using an MP2TS container, which significantly reduces the amount of latency before playback can begin. This implementation is based on a concept known as "fragmented transfer encoding," and it enables a video segment to be split into a series of smaller (i.e., shorter) fragments by placing the moov atom at the beginning of a segment and the moof boxes at the end of a defined fragment₁ or number of frames. Disaggregating segments therefore enables the packaging of encoded video to be highly optimized for reducing latency. The packager can write portions of a segment to a file based on the chunk size definition when inserting the moov atom at the start of the multiplexed video file, and immediately after inserting the moof box, without having to complete the multiplexing of an entire segment. The data size of a moof box is typically around 800 bytes, which negligibly increase the bandwidth required.

FIG. 2 shows an example timeline of fragmented transfer encoding or fragmented transfer segment. The environment 200 comprises an ABR live encoder 202, an ABR packager 204 and a computing device 214, such as a smartphone, a laptop and/or a smart television. The ABR live encoder 202 receives a content item, such as a live video stream. The ABR live encoder 202 encodes the live video stream into a plurality of different bitstreams, each bitstream a different bitrate and quality. The ABR packager segments the plurality of different bitstreams into a plurality of segments. The segments are transmitted to the ABR packager 204 where they are packaged for playback, for example, using an HLS, an MPEG DASH and/or an HTTP dynamic streaming (HDS) streaming protocol. Each segment 206, 208, 210 comprises a moov atom 216, 226, 236 and plurality of fragments 218, 220, 222, 224, 228, 230, 232, 234, 238, 240, 242, 244. On receiving a request for content at the computing device 214, a manifest file 212 is requested and is received at the computing device 214. The computing device 214 utilizes the manifest file 212 to request a segment of the content item, and the computing device 214 receives the segment fragments. In an example, the segments 206, 208, 210 are two seconds long, and are disaggregated into fragments of 500 ms (i.e., each segment comprises four fragments). In this example, a player at the computing device 214 requests the content item 1.5 seconds into segment C 210. The player can receive, and can start playing at fragment₁ 238 of segment C 210, even though segment C is still being multiplexed. In this case, there is a latency of 1.5 seconds associated with the request (i.e., the time into segment C 210 at which the request for the content item was received).

Figures 3, 4:
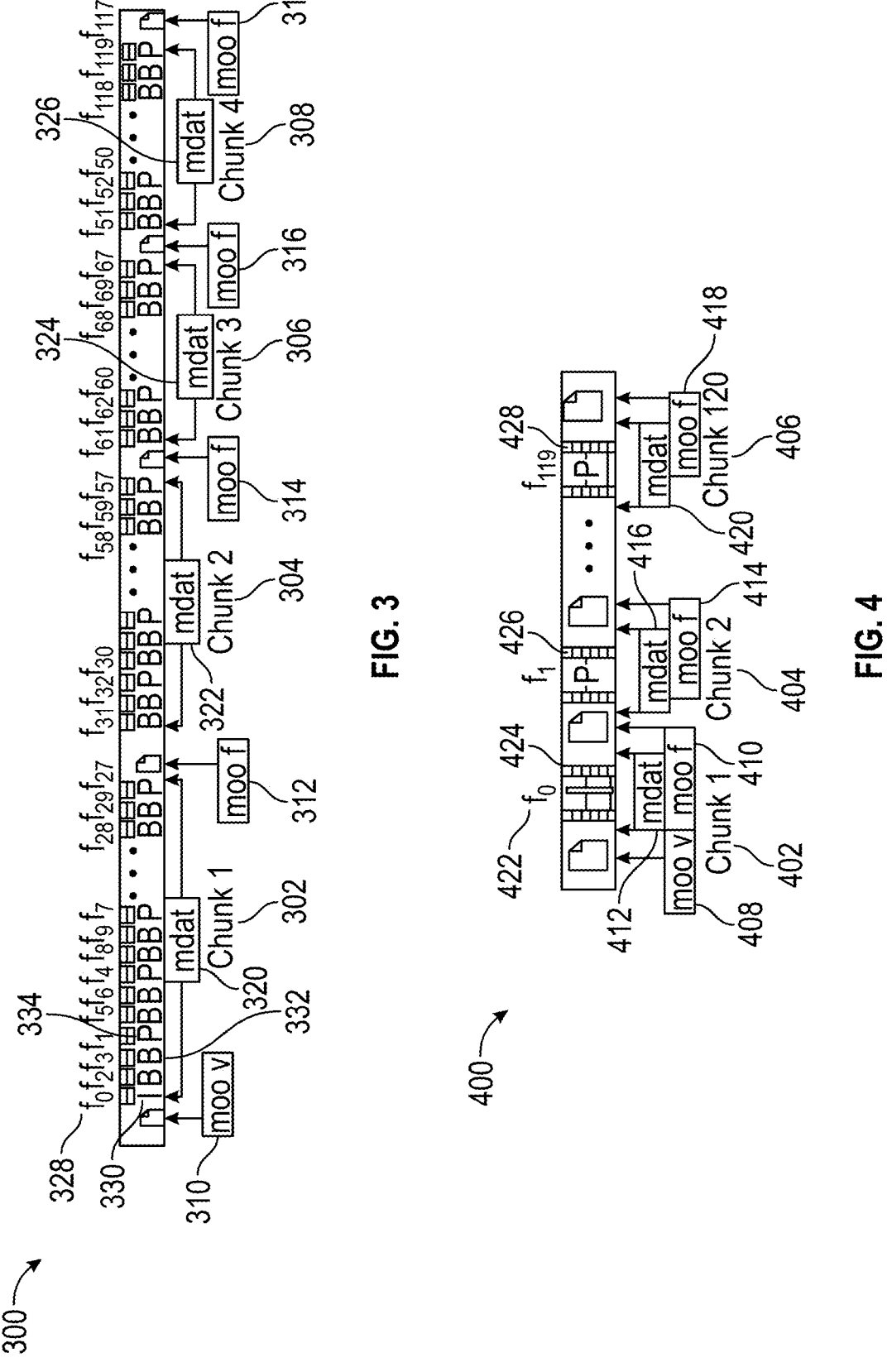
FIG. 3 shows a schematic diagram of example fragments.
FIG. 4 shows another schematic diagram of example fragments.

FIG. 3 shows a schematic diagram of example fragments that may be generated by the environment 200 in fragmented transfer encoding. The environment 300 comprises a plurality of fragments 302, 304, 306, 308. The first fragment 302 is preceded by a moov atom 310, and each fragment 302, 304, 306, 308 is followed by a moof box 312, 314, 316, 318. mdat fragment 320, 322, 324, 326 also is the media data associated with each fragment 302, 304, 306, 308. In an encoded bitstream, typically a predicted frame (P-frame) follows an intra-coded frame (I-frame) or an instantaneous decoder refresh (IDR) frame, and a plurality of bi-directional predicted frames (B-frames) follow the P-frame. For display, the first fragment 302 starts with an I-frame 330, and the I-frame 330 is followed by a plurality of B-frames 332 and P-frames 334. Subsequent fragments 304, 306, 308 comprise B-frames and P-frames.

FIG. 4 shows another schematic diagram of example fragments that may be generated by the environment 200 in fragmented transfer encoding where every frame is a fragment or movie fragment. In this example, each segment may comprise, for example, 120 fragments rather than the four fragments described in connection with FIG. 2. The environment 400 comprises a plurality of fragments 402, 404, 406. The first fragment 402 is preceded by a moov atom 408, and each fragment 402, 404, 406 is followed by a moof box 410, 414, 418. mdat fragments 412, 416, 420 are also associated with each fragment 402, 404, 406. The first fragment 402 comprises a frame 424 that is an I-frame 424. The second fragment 404 comprises a P-frame 426, and subsequent fragments each comprise a P-frame 428.

A tradeoff in reducing latency in this manner comes at a cost in bandwidth. First, the encoding will require an I-frame and P-frame GOP structure. B-frames are omitted as they introduce latency. As an example of how B-frames introduce latency, consider an IBBBP GOP structure playout order, which is IPBBB. As a result, the decoder cannot begin playout of the B pictures until the P picture has been received and decoded, resulting in a buffering of four frames and hence an associated latency with the buffering. Further, in order to achieve the absolute lowest latency, a moof box must typically be inserted after every frame. The size of a moof box is typically 800 bytes, which will increase the bitrate by around 400 kbps for a video of 60 fps (frames per second).

Figures 5, 6:
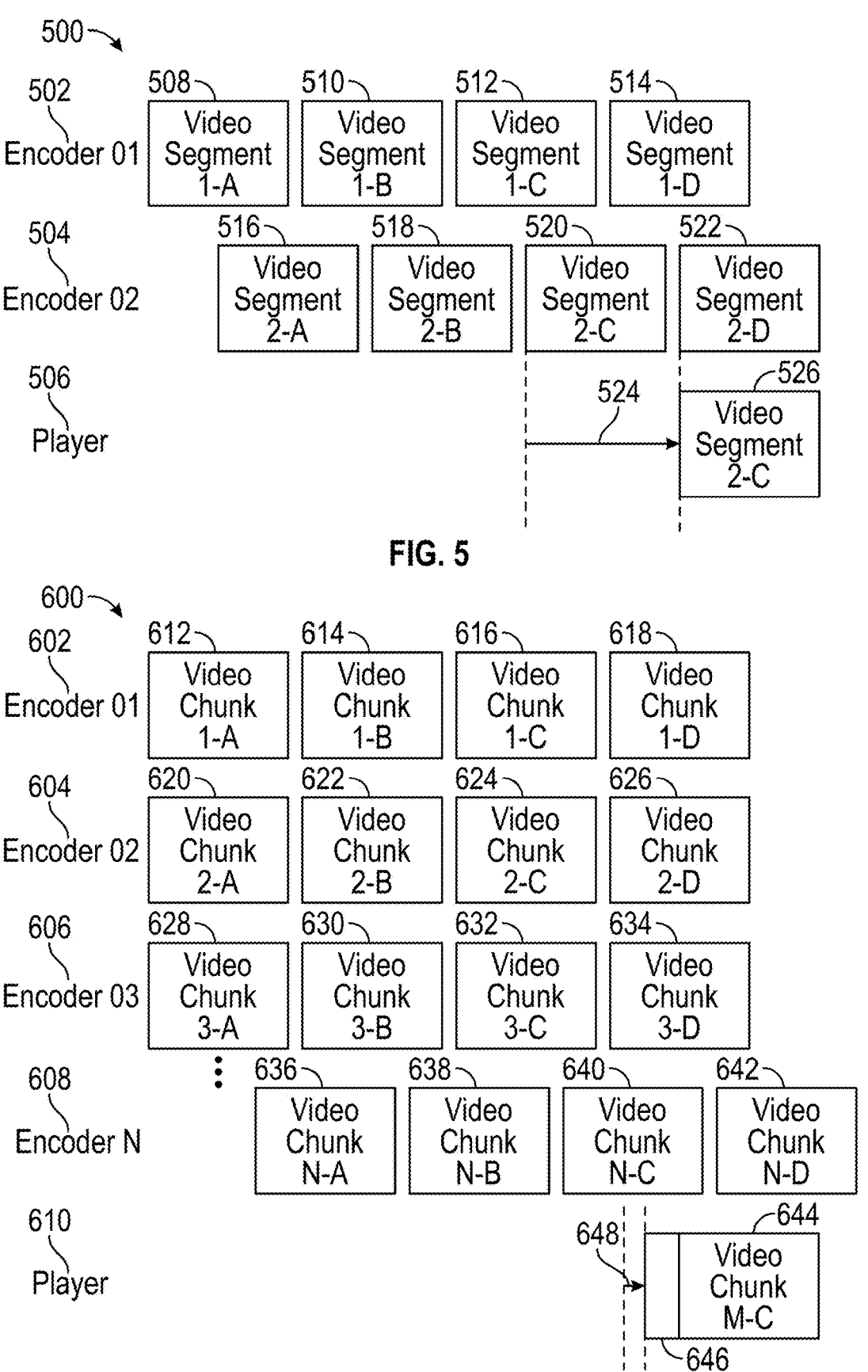
FIG. 5 shows a schematic diagram of encoders, in accordance with some embodiments of the disclosure.
FIG. 6 shows another schematic diagram of encoders, in accordance with some embodiments of the disclosure.

FIG. 5 shows a schematic diagram of encoders, in accordance with some embodiments of the disclosure. The environment 500 comprises a first encoder 502, a second encoder 504 and a player 506. In some examples, the encoders are ABR encoders feeding a packager or packagers for generating two CMAF ABR channels with a maximum latency of, for example, half a segment duration. The first encoder 502 encodes input content, such as a live content item, and the output of the first encoder 502 is packaged by a packager (not shown) into a first plurality of video segments 1-A to 1-D 508, 510, 512, 514, and the second encoder 504 encodes the input content, and the output of the second encoder 504 is packaged by the packager into a second plurality of video segments 2-A to 2-D 516, 518, 520, 522. Each of the first plurality of video segments corresponds to the each of the second plurality of video segments (i.e., video segment 1-A 508 corresponds to video segment 2-A 516), but the second plurality of video segments are encoded at an offset to the first plurality of video segments. Each segment has a duration 524. For example, if each video segment is two seconds long, the offset may be one second. In this example, by adding the second encoder 504 with the segment boundaries shifted by, in this example, one second, the latency is reduced from one and a half seconds to half a second. This is because by the time that the player 506 requests the content, video segment 2-C 520 is completed, and the video segment 2-C 520 starts from an IDR frame for immediate access and decoding. The player 506 receives the video segment 2-C 526 and generates the segment for output.

FIG. 6 shows another schematic diagram of encoders, in accordance with some embodiments of the disclosure. The environment 600 comprises a first encoder 602, a second encoder 604, a third encoder 606 and so on, up to an Nth encoder 608. In some examples, the first-Nth encoders 602-608 transmit the encoded bitstream to a packager (not shown), which creates chunked segments. The first encoder 602 encodes a first plurality of video fragment s 1-A to 1-D 612, 614, 616, 618 to create a first bitstream; the second encoder 604 encodes a second plurality of video fragment s 2-A to 2-D 620, 622, 624, 626 to create a second bitstream; the third encoder 606 encodes a third plurality of video fragment s 3-A to 3-D 628, 630, 632, 634 to create a third bitstream; and so on, up to the Nth encoder 608, which encodes an Nth plurality of video fragment s N-A to N-D 636, 638, 640, 642 to create an Nth bitstream. The encoders 602-608 produce a plurality of offset subchannels that, in some examples, feed the packager. The encoders may encode the video to a defined set of frame aligned streams and a common defined GOP structure, and it may be the packager that creates the chunked segments. The player 610 requests a fragment, and receives an encoded video fragment M-C 644, which comprises an IDR frame 646 and has a latency 648 of one frame. The reduced latency is achieved at the cost of additional encoding complexity, which can be beneficial where low latency is, for example, a critical parameter in measuring the quality of experience (QoE). In this example, there is no increase in bitrate because the bitstream created by the second encoder 604 also includes segments and GOPs of same length as those created by the first encoder 602. In this example, there is no increase in the number of IDRs in the bitstream.

A channel (i.e., for a live content item) may comprise multiple sub-channels, where each sub-channel is a stream of a live content item generated by each encoder, as shown in FIG. 6. For example, sub-channel 01 (associated with the Encoder 01 602) may be designated as a primary channel, while the other channels may be secondary channels. In another example, the sub-channel currently being downloaded to a player on a computing device may be designated as a primary channel. All the sub-channels comprise the same encoded, packaged and player downloaded content, and the same frame appears at the same time (or substantially the same time) in all of the sub-channels. As described herein, the selection of sub-channel to play will depend on when a player joins or requests a live content item. The timing may be managed by the server and player so that the latency is minimized.

The environment shown in FIG. 6 assumes the use of fragmented transfer encoding. In this example, each of the encoders 602, 604, 606, 608 utilizes the same length of fragment and GOPs, and shifts its starting IDR by, for example, one frame. This way, at any time that a player joins or requests the streamed content item, there is an IDR that has just completed encoding and is immediately available. Using a stack of encoders 602, 604, 606, 608 in this manner enables latency to be minimized to a single frame (therefore accommodating ultra-low latency use cases) from the encoding and playback perspectives.

Figure 7A:
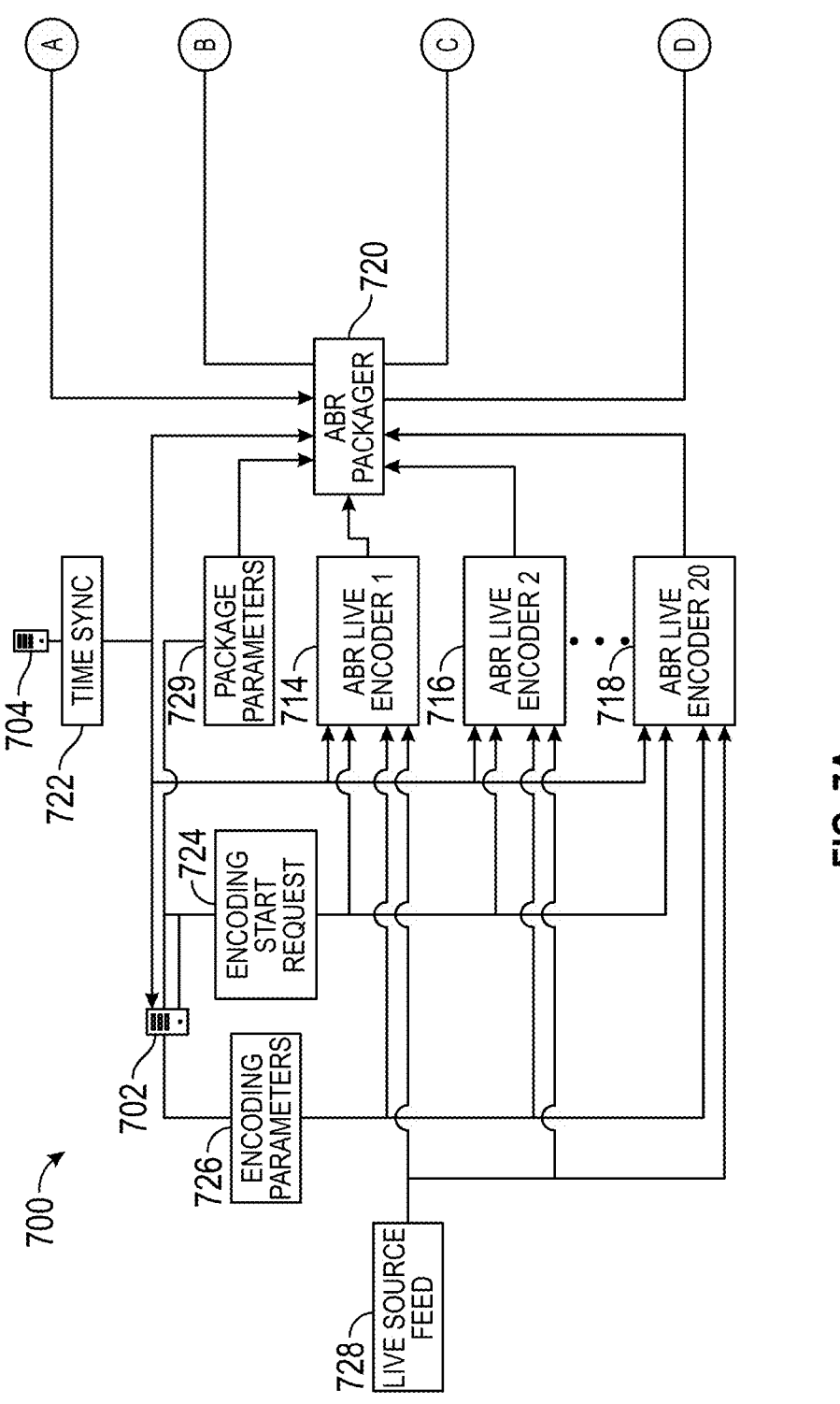
FIGS. 7A-7C show another schematic diagram of encoders, in accordance with some embodiments of the disclosure.
Figure 7B:
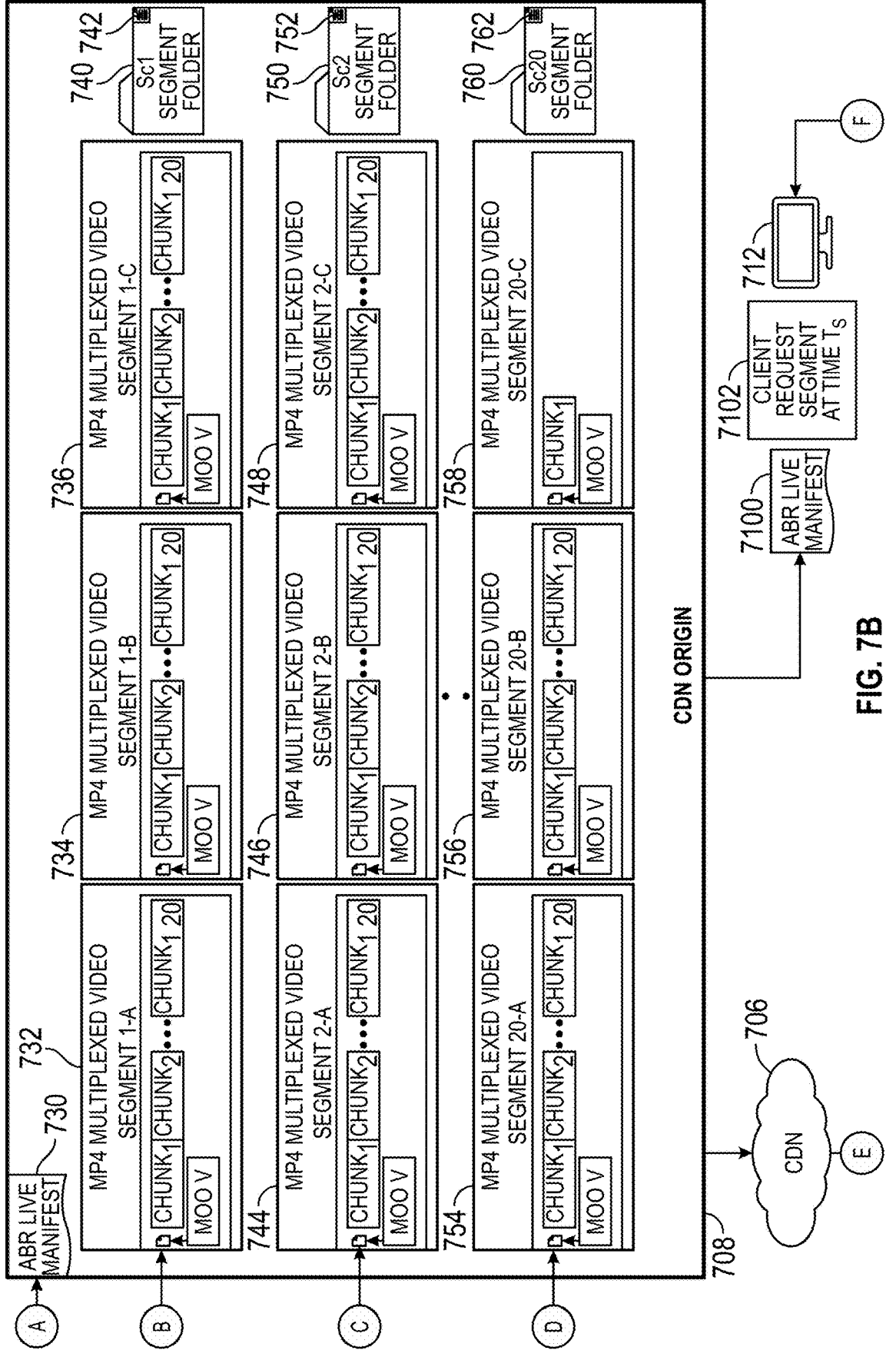
Figure 7C:
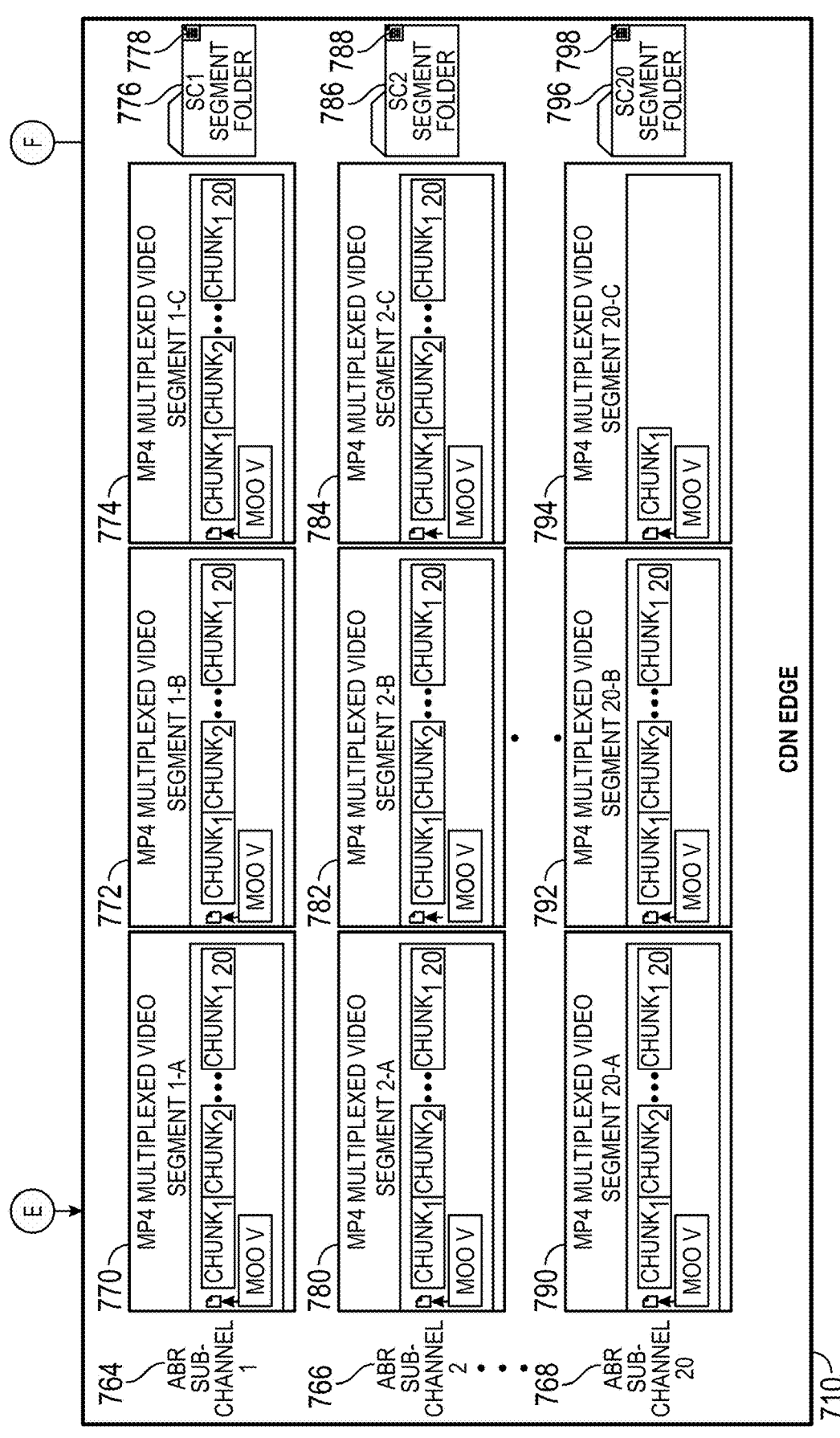

FIGS. 7A-7C show another schematic diagram of encoders, in accordance with some embodiments of the disclosure. In this diagram, 20 encoders, such as ABR encoders, generate 20 channels, such as CMAF ABR channels, with a maximum latency of 100 ms distributed over a CDN to edge nodes. The environment 700 comprises a first computing device 702, such as a first server, comprising a subchannel controller, and a second computing device 704, such as a second server, running a time synchronization service. The second server may be a network time protocol server. The environment 700 also comprises a CDN 706; a CDN origin 708; a CDN edge 710; at least one client computing device 712, such as a smartphone, a smart television and/or a tablet device; a plurality of encoders 714, 716, 718, such as ABR live encoders; and a packager 720, such as an ABR packager.

In this example, there are 20 encoders, although only the first, second and 20$^{th}$ encoders 714, 716, 718 are shown.

Time synchronization parameters 722 are transmitted from the second computing device 704 running the time synchronization service to the subchannel controller 702, the plurality of encoders 714, 716, 718 and the packager 720 to each of these components to operate in a synchronized manner. An encoding start request 724 and encoding parameters 726 are transmitted from the subchannel controller 702 to the plurality of encoders 714, 716, 718. A live source feed 728, such as a live television transmission of an event, transmits, for example, via a third server, a live content item to the plurality of encoders 714, 716, 718. Package parameters 729 are transmitted from the subchannel controller to the packager 720, and encoded bitstreams, such as ABR encoded bitstreams, are also received at the packager 720 from the plurality of encoders 714, 716, 718.

The packager 720 transmits a manifest 730, such as an ABR live manifest, to the CDN origin 708, where it is stored. The packager 720 also transmits chunked segments, such as ABR chunked segments, to the CDN origin 708 for each of the received bitstreams, where they are stored in corresponding segment folders 740, 750, 760. The segment folders 740, 750, 760 each store metadata 742, 752, 762 respectively indicating the segment start times, for example, in milliseconds. The first segment folder 740, corresponding to the first bitstream, stores the video segments 1-A to 1-C 732, 734, 736 for the first bitstream. In this example, the video segments are MP4 multiplexed video segments, each comprising a moov file and a plurality of chunks. The second segment folder 750, corresponding to the second bitstream, stores the video segments 2-A to 2-C 744, 746, 748 for the second bitstream. The 20$^{th}$ segment folder 760, corresponding to the 20$^{th}$ bitstream, stores the video segments 20-A to 20-C 754, 756, 758 for the 20$^{th}$ bitstream. Segment folders for the third to 19$^{th}$ bitstreams are not shown, but operate in a similar manner. In this example, the segments are two seconds long at a frame rate of 60 fps, and the start of the first segment of each bitstream is delayed by approximately 100 ms with respect to the previous bitstream. This gives a maximum playout latency of approximately 100 ms (i.e., the difference between when a request to start a bitstream is received and the start of the first available segment). In another example, a number of frames may be selected for the subchannel separation, rather than a time period. If a number of frames is selected, this may be based on the framerate of the encoding and the segment size. A valid setting for the number of subchannels may be calculated as follows:

$$(\text{framerate per second} \times \text{segment size}) \bmod \text{number of subchannels} = 0$$

The CDN origin 708 transmits a multicast segment fragment distribution, such as a multicast ABR segment fragment distribution, via the CDN 706 to the CDN edge 710, where the segments for each subchannel 764, 766, 768, such as ABR subchannels, are stored in corresponding segment folders 776, 786, 796. The segment folders 776, 786, 796 each store corresponding metadata 778, 788, 798 indicating the segment start times, for example, in milliseconds. The first segment folder 776, corresponding to the first bitstream, stores the video segments 1-A to 1-C 770, 772, 774 for the first bitstream. In this example, the video segments are MP4 multiplexed video segments, each comprising a plurality of fragments. The second segment folder 786, corresponding to the second bitstream, stores the video segments 2-A to 2-C 780, 782, 784 for the second bitstream. The 20$^{th}$ segment folder 796, corresponding to the 20$^{th}$ bitstream, stores the video segments 20-A to 20-C 790, 792, 794 for the 20$^{th}$ bitstream. Segment folders for the third to 19$^{th}$ bitstreams are not shown, but operate in a similar manner.

At the client computing device 712, a request 7102 for a segment of the live content item is generated, for example, in response to an input received via an ABR compliant player. The manifest file 7100, such as an ABR live manifest file, is transmitted from the CDN origin 708 to the client computing device 712, and segment fragments are transmitted from the CDN edge 710 to the client computing device 712. These fragments may, for example, comprise an IDR and up to five P-frames from 20-C fragment 794 if segment corresponds to the time at which the request 7102 for the segment of the live content item is generated.

The environment 700 illustrates an example of using, e.g., CMAF with HLS or MPEG DASH. In this example, a maximum latency of 100 ms is selected with two-second segments and the encoding is at 60 fps. Based on this, 20 ABR transcoder subchannels are created. In some examples, this may be done automatically, leveraging software encoding, or graphics processing unit (GPU) hardware encoding based on the availability of GPUs in a cloud-based encoding solution. In some examples, it is possible to optimize and reduce the number of encoders or the versions of bitstreams in a bitrate ladder, considering content characteristics, user behaviors and/or latency requirements.

In some examples, network QoS can pose a problem when running very low latency modes, as described herein. A player and/or application, such as an interactive application, running on a computing device may have issues when attempting to calculate a bitrate. An initial loading of segments may be performed to determine a bitrate at the initial loading of a CMAF segment from a selected subchannel. Once the bitrate is determined by the loading an initial subchannel segment, the player and/or application may request a segment for the calculated bitrate. The server may deliver the segment from that same subchannel to the player and/or application. This initial test may increase initial playout time, but once playback has started, the player and/or application may be as close to live as possible based on the number of subchannel encodings for the content. For the enablement of continuous playback in the case of a reduction in network QoS, the player and/or application buffer may be dynamic, which enables the buffer to increase or decrease in size based on the network QoS. When in an absolute lowest latency mode, when bandwidth has dropped and the fragments are delivered to the client device in less than real time, buffering may occur, which may increase latency. In some examples, if the latency is above a determined threshold, based on an interactive application, interactivity on the computing may be disabled. Once the player and/or application has adjusted to a new bandwidth based on the change in QoS, the player and/or application may advance to the most recent segment from the selected subchannel and run again with a minimal buffer and reenable interactivity, based on the video.

Figure 8:
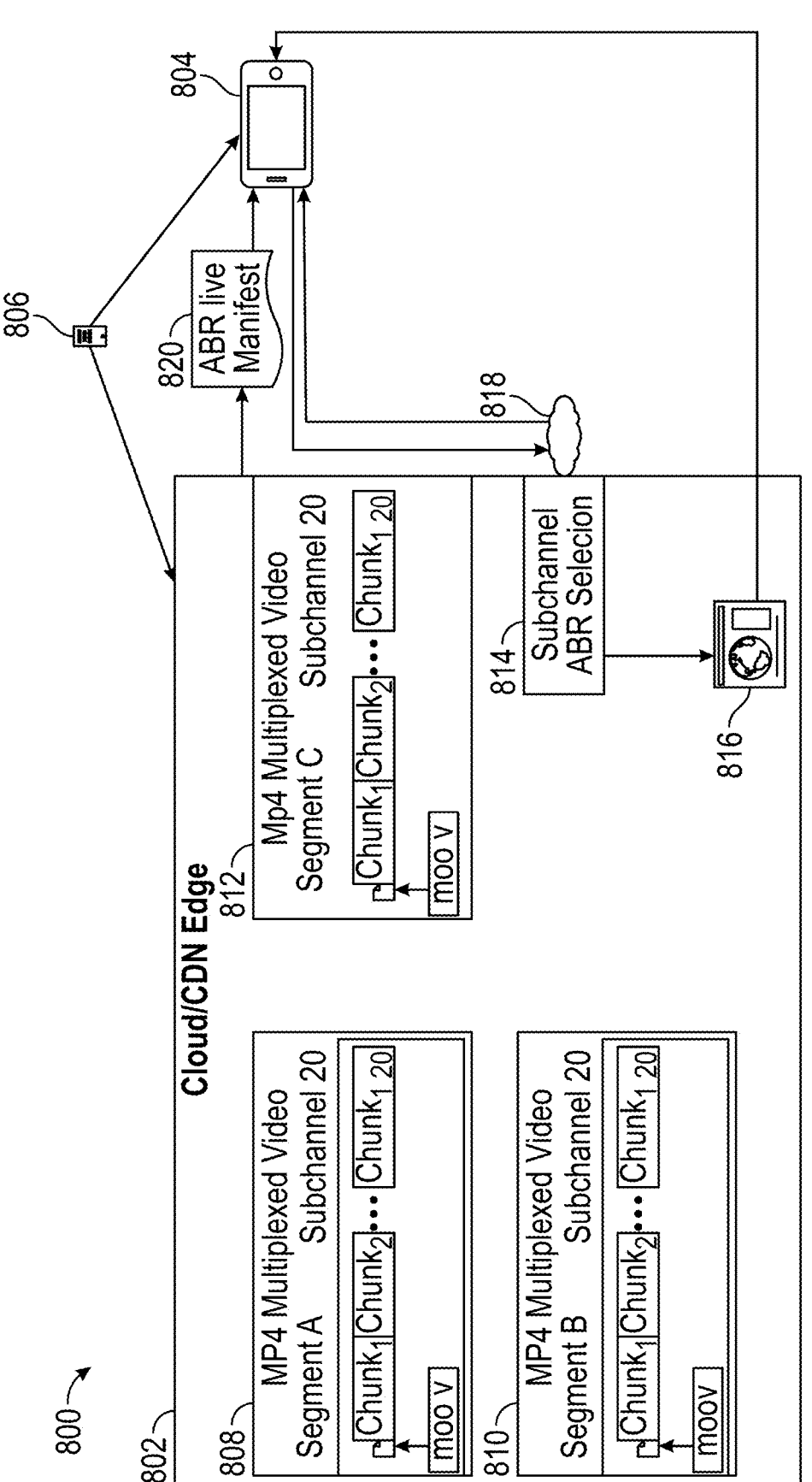
FIG. 8 shows a schematic diagram of a player buffer, in accordance with some embodiments of the disclosure.

FIG. 8 shows a schematic diagram of a player buffer, in accordance with some embodiments of the disclosure. The environment 800 comprises a cloud and/or CDN edge 802; one or more client computing devices 804, such as a smartphone, smart television and/or tablet; and a server 806 running a time synchronization service. The server 806 may be a network time protocol server. A plurality of video segments A-C 808, 810, 812 from a subchannel, such as subchannel 20, are processed at the cloud and/or CDN edge 802. In some examples, the video segments may be MP4 multiplexed video segments. As discussed above, each video segment A-C 808, 810, 812 comprises a moov file and a plurality of fragments. Video segment A 808 may be a previously encoded segment, video segment B 810 may be a segment that is currently being encoded and video segment C 812 may be a segment that is yet to be encoded. A subchannel selection module 814, such as a subchannel ABR selection module 814, may select a subchannel based on, for example, which channel can deliver live content with the lowest latency. An interactive application service 816 communicates with the subchannel selection module 814 and transmits data via a network, such as the internet, to the client computing device 804. A manifest 820, such as an ABR live manifest, and the segment fragments are transmitted via a network 818, such as the internet, to the client device 804. The time synchronization service running on server 806 transmits time synchronization data to the cloud and/or CDN edge 802 and the client computing device 804 to enable accurate time synchronization between the cloud and/or CDN edge 802 and the client computing device 804.

FIG. 8 may be applied to a dynamic player buffer, such as a dynamic ABR player buffer. In this example, an interactivity mode may be enabled, and a player and/or application may be playing within 100 ms of latency. FIG. 8 shows an example of the startup of an ABR client in low latency mode. Segment A 808 is initially delivered to the client computing device 804. At this point, the player and/or application measures the time for the segment to download, and generates a bandwidth estimate. In some examples, this segment does not have to be saved into a buffer at the client computing device, as it may be utilized only for bandwidth measurement. Based on the initial playout starting and being within 100 ms of live, the interactive application service 816 may send a notification to the player and/or application running on the client device 804 to enable interactive services.

At the time of joining, the player and/or application may receive a dynamically updated manifest for the sub-channel that can deliver the most recently encoded IDR for the player and/or application to start decoding. The player and/or application may send a request for a target bitrate. Depending on the possible latencies in other components, for example in networking components, an application running on the server may choose to send the next sub-channel upon the reception of the request. This may occur, for example, if the next sub-channel has just completed encoding an IDR at the start of a fragment, while it was not finished at the time of the server sending the manifest of the previous sub-channel. Common operations in channel change may apply, but in this example, it is the server that actively initiates such sub-channel changes for the client.

A player and/or application running on the computing device 804 may experience a reduction in bandwidth, resulting in the encoded pictures at the given bitrate not arriving in time from the selected subchannel. In this example, the player and/or application may begin to buffer encoded pictures into its buffer. Once a complete segment is downloaded, the player and/or application may have enough data to have an accurate measurement of the bandwidth and adjust for the next segment to download. In the example discussed below, the player and/or application is already falling further behind the live content while the buffer is being completed. A subchannel selection subsystem, such as a subchannel ABR selection subsystem, may send the latency time for an "Interactive Video Service 1 Session" to the interactive application service 816. Based on the requirements from interactive application service 816, the interactive application service 816 may send a request to the player and/or interactive application running on the computing device 804 to disable the interactive mode in the application.

When a player and/or interactive application running on the computing device 806 experiences a low bandwidth condition, a complete segment of frames may be downloaded to determine the new quality segment to request. Once the player and/or interactive application has finally completed the segment download, a new quality segment may be requested by the player and/or interactive application. Due to the buffering of the previously downloaded segment, the next segment in the same subchannel may have introduced much more latency. At this point, a subchannel with the same segment at the lower quality with a later offset may be selected to bring the player and/or interactive application back to within 100 ms of live. Depending on the delay time, a segment from another subchannel may be delivered to the player and/or interactive application. In an example below, the subchannel selection system may select the next segment to deliver, for example, segment B 810 from subchannel 18 as opposed to segment B from subchannel 2 (which was the previous subchannel). In some examples, there may be cases where the delay could cause a skip in segments to be delivered. Depending on the amount of delay and the timing of the subchannel encodings, segment B could be selected from subchannel 1 to deliver to the player and/or interactive application as opposed to any of the subchannel segments for segment B.

Figure 9B:
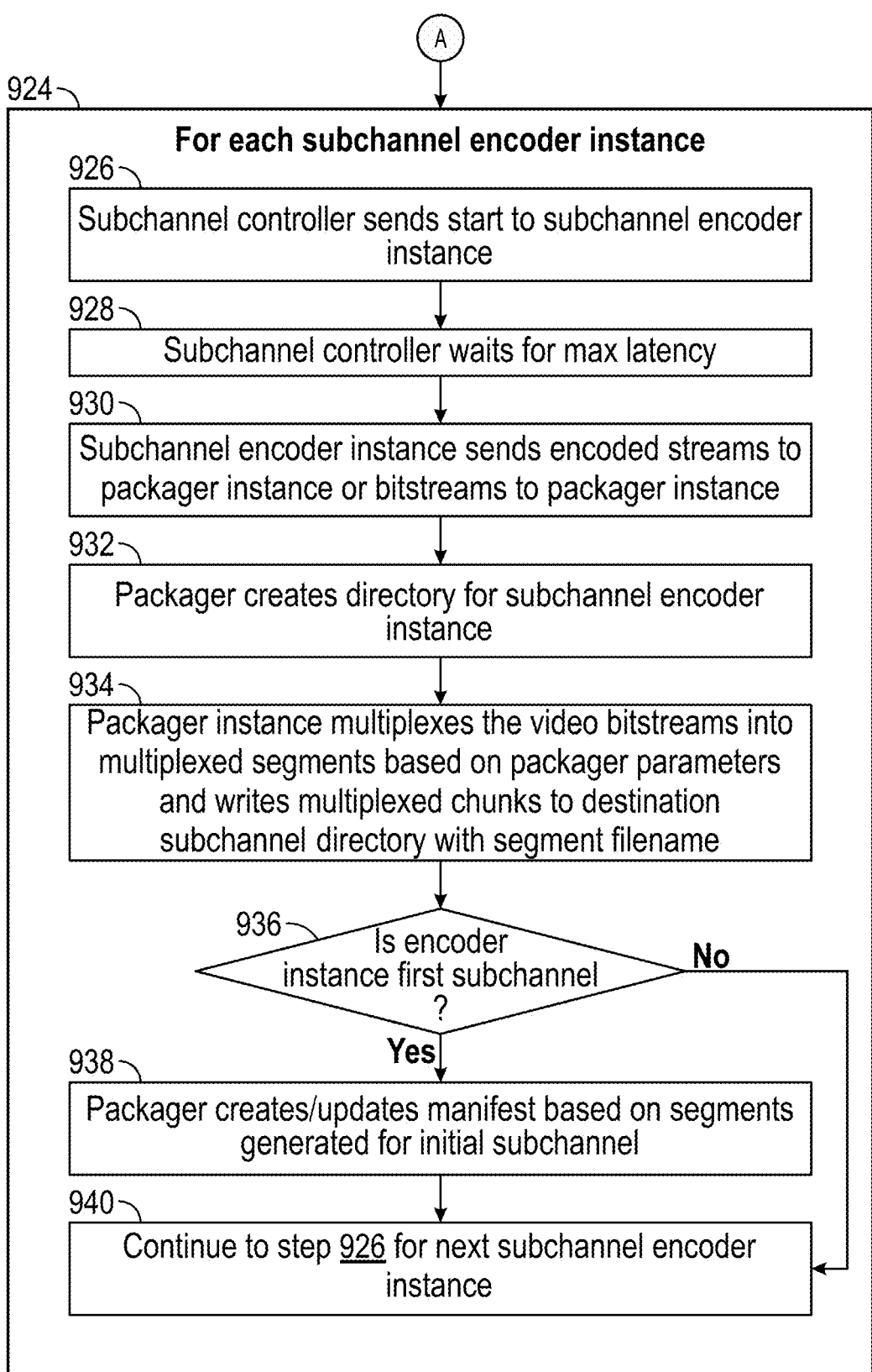

FIGS. 9A-9B show a flowchart of illustrative steps for enabling reduced latency in video streaming, in accordance with some embodiments of the disclosure. Process 900 may be implemented, in whole or in part, on any of the computing devices mentioned herein. In addition, one or more actions of the process 900 may be incorporated into or combined with one or more actions of any other processes or embodiments described herein.

The process 900 comprises an initial subchannel startup stage, which comprises steps 902 to 922. At step 902, a subchannel controller receives an indication of a desired frame rate, encoding GOP structure, segment size, encoding bitrate and maximum latency. In some examples, the frame rate may be in frames per second, the segment size may be in seconds, the encoding bitrate may be an ABR bitrate and/or the maximum latency may be in milliseconds. At step 904, a required number of subchannels is determined. Generally, the required number of subchannels may be determined as follows:

$$\text{Required Subchannels} = \text{round}$$

$$(\text{segment size} \times \text{desired frame rate}) (\text{maximum latency} \times \text{desired frame rate})$$

In an example, the required number of subchannels when defining the delay in milliseconds may be determined as follows:

$$\text{Required Subchannels} =$$

$$\text{round} ((\text{segment size in seconds} \times \text{desired frame rate in seconds})$$

$$/(\text{maximum latency in milliseconds}/$$

$$(1000 \text{ milliseconds}/\text{desired frame rate in seconds})))$$

At step 906 it is determined whether the number of encoders, for example the number of ABR encoders, available is equal to or greater than the required number of subchannels. If, at step 906, it is determined that the number of encoders available is not equal to or greater than the required number of subchannels, then the process proceeds to step 908, where an indication that not enough encoders are available is generated for output and the process ends. In some examples, outputting the indication may comprise displaying a message stating "Not enough ABR encoders available. Increase latency or wait. Provide x available encoders, where x=the required number of subchannels minus the number of encoders available, for example "available via a cloud-based server."

If, at step 906, it is determined that the number of encoders available is equal to or greater than the required number of subchannels, then the process proceeds to step 910, where the required number of encoder instances are started, for example, based on the calculated number of subchannels. In some examples, the encoder instances may be ABR encoder instances in a cloud-based system. At 912, the encoder instances synchronize with a time server, such as a network time protocol (NTP) server, and at 914, a packager instance is started, for example, a cloud-based system starts an ABR packager instance. At 916, the packager instances synchronize with the time server. At 918, a subchannel controller sends encoding parameters, with the GOP structure, segment size, bitrates and frame rates to the packager. At 920, the subchannel controller sends a number of subchannel encoders and bitstream sources for each subchannel encoder's encoded streams, a fragmentsize, for example, a fragmentsize of one, and a segment size to the packager. At 922, it is determined whether the packager instance and the encoder instances are instantiated. If, at 922, it is determined that the packager instance and the encoder instances are not instantiated, then the process loops around. If, at 922, it is determined that the packager instance and the encoder instances are instantiated, then the process proceeds to 924, where steps 926-938 are performed for each subchannel encoder instance.

At step 926, a subchannel controller sends a start message to a subchannel encoder instance, and at step 928, the subchannel controller waits for an indication of the maximum latency. At step 930, the subchannel encoder instance sends encoded streams, such as ABR encoded streams, to a packager instance or bitstreams to the packager instance. At 932, the packager creates a directory for the subchannel encoder instance, and at 934, the packager instance multiplexes the video bitstreams, such as ABR video bitstreams, into multiplexed segments based on the packager parameters, and the packager instance writes multiplexed segment fragments to a destination (e.g., on an origin server) subchannel directory with a segment filename, in some examples, with the same filename across encoder instances.

At 936, it is determined whether the encoder instance is a first subchannel. If, at 936, it is determined that the encoder instance is a first subchannel, then, at 938, the packager creates and/or updates the manifest based on the segments generated for the initial subchannel. The process then proceeds to step 940, where the process loops around to 926 and the process is repeated for the next subchannel encoder instance. If, at 936, it is determined that the encoder instance is not the first subchannel, then the process proceeds to step 940, where the process loops around to 926 and the process is repeated for the next subchannel encoder instance.

Figure 10B:
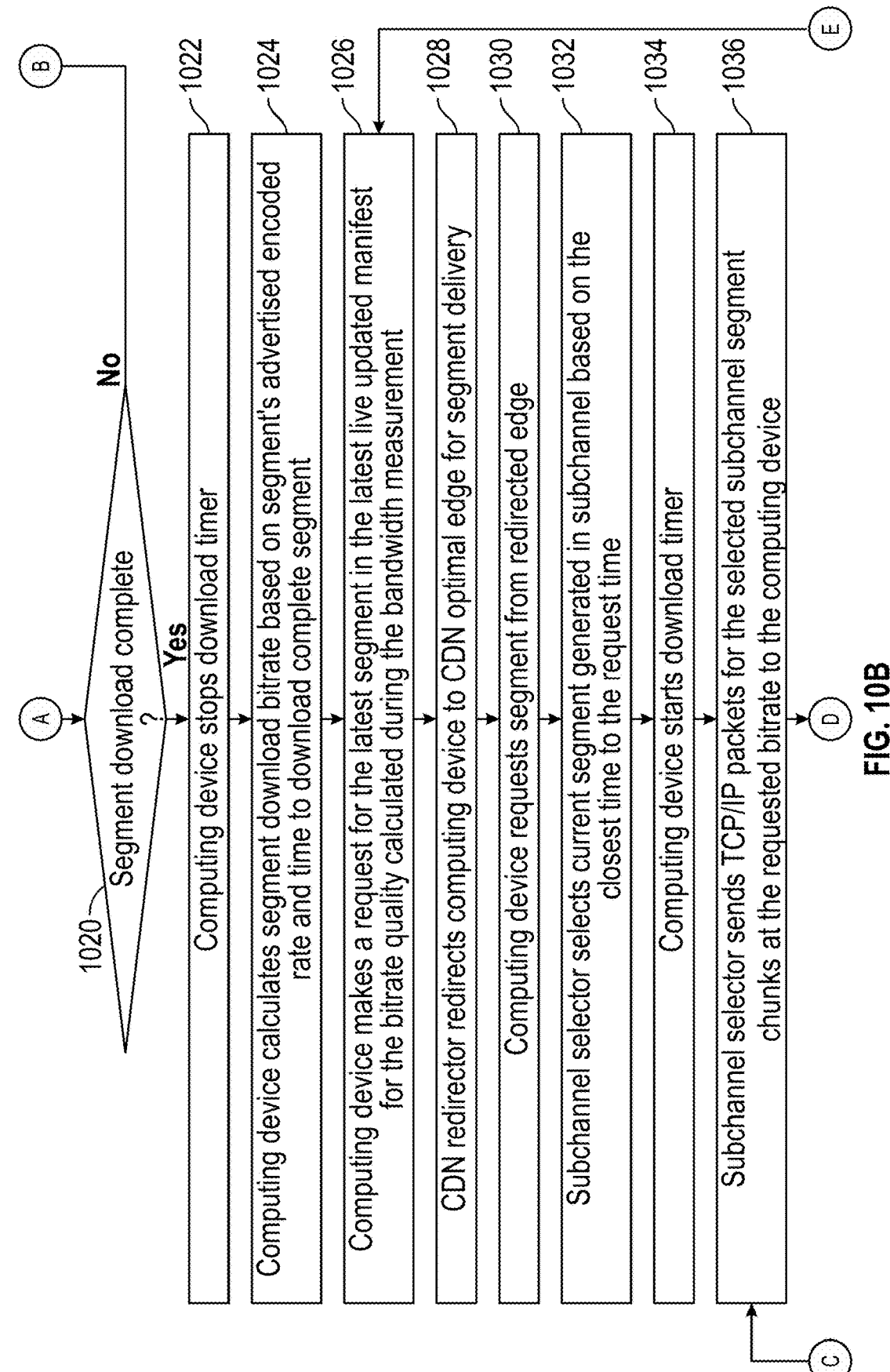
Figure 10C:
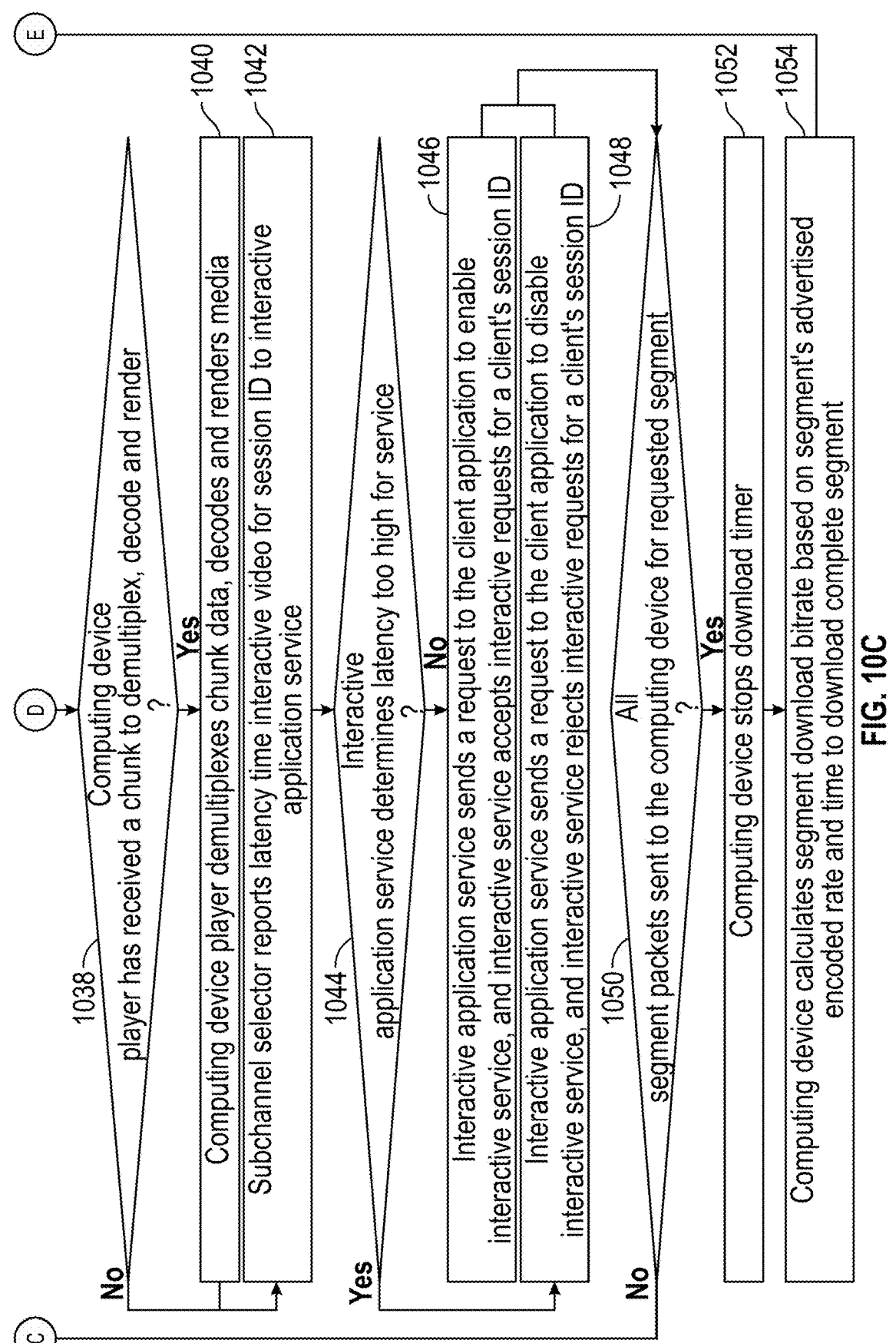

FIGS. 10A-10C show another flowchart of illustrative steps for enabling reduced latency in video streaming, in accordance with some embodiments of the disclosure. Process 1000 may be implemented, in whole or in part, on any of the computing devices mentioned herein. In addition, one or more actions of the process 1000 may be incorporated into or combined with one or more actions of any other processes or embodiments described herein.

The process 1000 may be utilized to enable a subchannel selection and client delivery with low latency mode enabled. At step 1002, the time synchronized between a packager and a computing device, for example, NTP time, may be synchronized with an ABR packager and an ABR client. At step 1004, a subchannel selector reads and monitors segment start time metadata for segment start times for all subchannels for a live low latency interactive service. In some examples, the subchannel selector may be a subchannel ABR selector, and the start times may be in milliseconds. At step 1006, a request to watch and/or interact with a low latency interactive service is received. For example, input may be provided at the computing device to watch and/or interact with an ABR low latency interactive service. At step 1008, a low latency interactive application running on the computing device makes a manifest request for the low latency interactive service. At step 1010, the computing device receives a latest updated manifest, such as a live manifest, for the low latency interactive service. At step 1012, the computing device makes a request for the latest completely generated segment (i.e., the next to last segment) represented in the manifest to a CDN for the lowest bitrate segment. At step 1014, a CDN redirector redirects the computing device to an optimal CDN edge for segment delivery. At step 1016, the computing device requests a segment from redirected edge. At step 1017, a subchannel selector, such as an ABR subchannel selector, selects the last segment generated in the subchannel closest to the time of the computing device for the segment currently being generated. At step 1018, the computing device starts a download timer, and at step 1019, the computing device downloads segment data.

At step 1020, it is determined whether the segment download is complete. If, at step 1020, it is determined that the segment download is not complete, then the process reverts to step 1019, where the computing device continues to download segment data. If, at step 1020, it is determined that the segment download is complete, then the process proceeds to step 1022, where the computing device stops the download timer. At step 1024, the computing device calculates a segment download bitrate based on the advertised encoded rate of the segment, and the time to download the complete segment. At step 1026, the computing device makes a request for the latest segment in the latest updated manifest for the bitrate quality calculated during the bandwidth measurement. At step 1028, a CDN redirector redirects the computing device to an CDN optimal edge for segment delivery. At step 1030, the computing device requests a segment from the redirected edge. At step 1032, the subchannel selector selects the current segment generated in a subchannel based on the closest time to the request time, and at step 1034, the computing device starts the download timer. At step 1036, the subchannel selector sends network packets, such as Transmission Control Protocol (TCP) and/or Internet Protocol (IP) packets, for the selected subchannel segment fragments at the requested bitrate to the computing device. In other examples, such as HTTP/3, the network packets may be QUIC user datagram protocol (UDP) packets.

At 1038, it is determined whether a player running on the computing device has received a fragment to demultiplex, decode and render. If, at 1038, it is determined that the player running on the computing device has received a fragment, then the process proceeds to step 1040, wherein the player running on the computing device demultiplexes the fragment data, decodes and renders media, and the process proceeds to step 1042. If, at 1038, it is determined that the player running on the computing device has not received a fragment, then the process proceeds to step 1042, where the subchannel selector reports a latency time of the interactive video for a particular session ID to an interactive application service.

At 1044, the interactive application service determines whether the latency is too high for the service. If, at 1044, it is determined that the latency is not too high, then the process proceeds to step 1046, where the interactive application service sends a request to an application running on the computing device to enable the interactive service, and the interactive service accepts interactive requests for a particular client session ID. If, at 1044, it is determined that the latency is too high, then the process proceeds to step 1048, where the interactive application service sends a request to an application running on the computing device to disable the interactive service, and the interactive service rejects interactive requests for a particular client session ID. From 1046 or 1048, the process proceeds to step 1050.

At 1050, it is determined whether all segment packets have been sent to the computing device for the requested segment. If, at 1050, it is determined that not all the packets have been sent to the computing device, the process loops around to step 1036. If, at 1050, it is determined that all the packets have been sent to the computing device, the process proceeds to step 1052, where the computing device stops the download timer. At step 1054, the computing device calculates a segment download bitrate based on the segment's advertised encoded rate and time to download a complete segment, and the process reverts to step 1026.

Figure 11B:
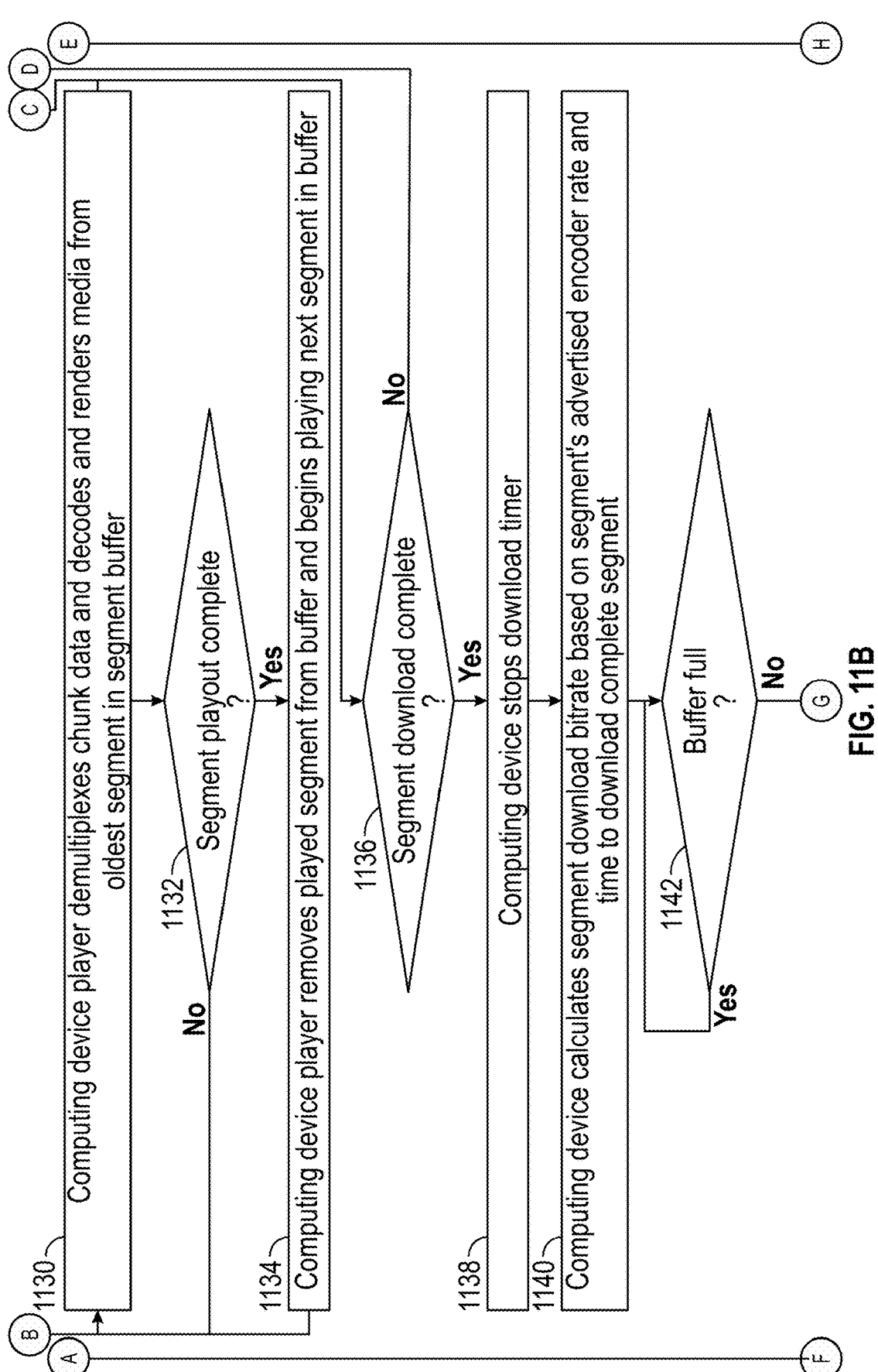
Figure 11C:
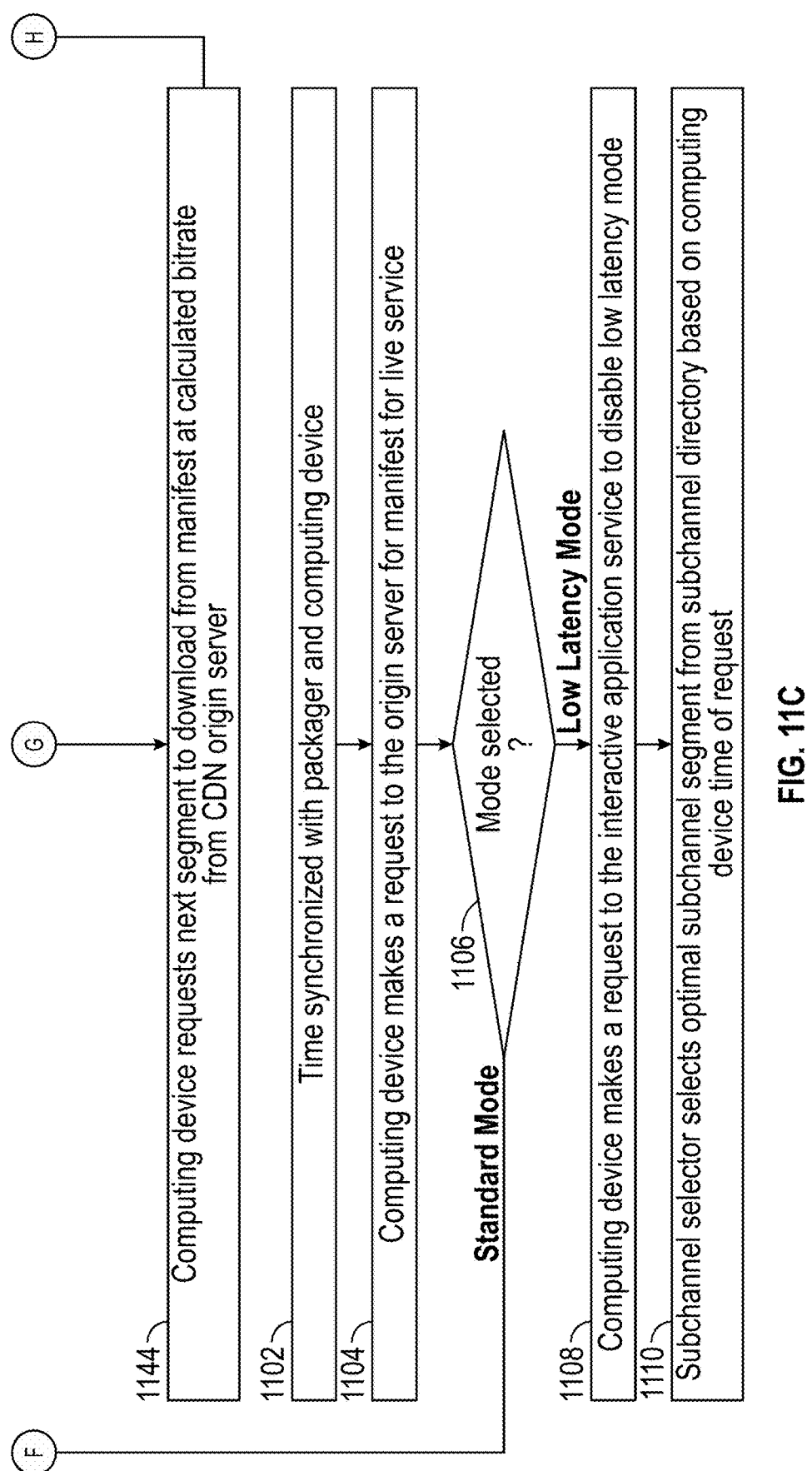

FIGS. 11A-11C show another flowchart of illustrative steps for enabling reduced latency in video streaming, in accordance with some embodiments of the disclosure. Process 1100 may be implemented, in whole or in part, on any of the computing devices mentioned herein. In addition, one or more actions of the process 1100 may be incorporated into or combined with one or more actions of any other processes or embodiments described herein.

At step 1102, the time is synchronized with a packager and a computing device, for example, NTP time is synchronized with an ABR packager and an ABR client device. At step 1104, the computing device makes a request to an origin server for a manifest, such as an ABR manifest, for a live content item. At step 1106, it is determined whether a standard mode or a low latency mode is selected. If a low latency mode is selected, the process proceeds to step 1108, and if a standard mode is selected, the process proceeds to step 1112.

At step 1108, the computing device makes a request to an interactive application service to disable a low latency mode. At step 1110, a subchannel selector selects an optimal subchannel segment from a subchannel directory based on the computing device time of request utilizing, for example, the method described in connection with FIG. 10 above.

At step 1112, the computing device makes a request to the interactive application service to enable a low latency mode. At step 1114, the computing device requests segments nSegment−2, where nSegment is the latest segment being generated by the packager and distributed across a CDN to a CDN origin at the lowest bitrate in a corresponding manifest. At step 1116, a CDN redirector redirects the computing device to an optimal edge node, and at step 1118, the computing device makes a segment download request to the redirected CDN edge node. At step 1120, a subchannel selector selects a subchannel directory, such as a subchannel 1 directory, for the segment to be delivered to the computing device, and at step 1122, the computing device starts a download timer. At step 1124, the computing device starts downloading the segment data, and at step 1126, the computing device determines if a buffer is full enough for a reliable playout. At step 1128, it is determined whether the buffer is full enough for a reliable playout.

If, at step 1128, it is determined that the buffer is full enough for a reliable playout, then the process proceeds to step 1130, where a player, such as an ABR player, on the computing device demultiplexes fragment data and decodes and renders media from the oldest segment in the buffer (i.e., a segment buffer). At step 1132, it is determined whether segment playout is complete. If, at step 1132, it is determined that segment playout is not complete, then the process loops back to step 1130; however, if, at step 1132, it is determined that segment playout is complete, then the process proceeds to step 1134, where the computing device player removes the played segments from the buffer and begins playing the next segment in the buffer.

If, at step 1128, it is determined that the buffer is full enough for a reliable playout, then the process proceeds to step 1136, where it is determined whether the segment download is complete. If, at step 1136, it is determined that the segment download is not complete, the process loops back to step 1124; however, if, at step 1136, it is determined that the segment download is complete, then the process proceeds to step 1138, where the computing device stops the download timer. At step 1140, the computing device calculates the segment download bitrate based on segment's advertised encoded rate and the time to download the complete segment. At step 1142, it is determined whether the buffer is full. If the buffer is full, the process loops to step 1142 again; however, if the buffer is not full, then the process proceeds to step 1144, where the computing device requests the next segment to download, from the manifest, at a calculated bitrate from the CDN origin server, and the process loops back to step 1116.

FIG. 12 shows another flowchart of illustrative steps for enabling reduced latency in video streaming, in accordance with some embodiments of the disclosure. Process 1200 may be implemented, in whole or in part, on any of the computing devices mentioned herein. In addition, one or more actions of the process 1200 may be incorporated into or combined with one or more actions of any other processes or embodiments described herein.

At step 1202, a live content item is received, and at step 1204, using a first encoder, at least a first portion of the live content stream is encoded into a first bitstream, and a packager packages the first bitstream into a first plurality of segments starting at a first time. At step 1206, an offset is determined, and at step 1208, at least a second portion of the live content stream is encoded, using a second encoder, into a second bitstream, and a packager packages the second bitstream into a second plurality of segments, wherein second plurality of segments starts at a second time, based on the offset and after the first time. In some examples, the output from the first and second encoders may be transmitted to a packager for producing the segments.

FIG. 13 shows a block diagram representing components of a computing device and dataflow therebetween for enabling reduced latency in video streaming, in accordance with some embodiments of the disclosure. Computing device 1300 comprises input circuitry 1304, control circuitry 1308 and output circuitry 1328. The computing device 1300 may be, for example, a server. Control circuitry 1308 may be based on any suitable processing circuitry (not shown) and comprises control circuits and memory circuits, which may be disposed on a single integrated circuit or may be discrete components and processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i9 processors) or multiple different processors (e.g., an Intel Core i5 processor and an Intel Core i7 processor) and/or a system on a chip (e.g., a Qualcomm Snapdragon 888). Some control circuits may be implemented in hardware, firmware, or software.

First input is received 1302 by the input circuitry 1304. The input circuitry 1304 is configured to receive inputs related to a computing device. For example, this may be via a keyboard and a mouse. In other examples, the input may be received via a touchscreen, an infrared controller, a Bluetooth and/or Wi-Fi controller of the computing device 1300, and/or a microphone. In another example, this may be via a gesture detected via an extended reality device. In a further example, the input may comprise instructions received via another computing device. The input circuitry 1304 transmits 1306 the user input to the control circuitry 1308.

The control circuitry 1308 comprises a live content item receiving module 1310, a first encoding and packaging module 1314, an offset determination module 1318, a second encoding and packaging module 1322 and output circuitry 1328 comprising a bitstream output module 1330. The input is transmitted 1306 to the live content item receiving module 1310, where a live content item is received, for example, via the internet. The received live content item is transmitted 1312 to the first encoding and packaging module 1314, where the live content item is encoded into a first bitstream and is packaged into a first plurality of segments, with the first segment of the first plurality of segments starting at a first time in the live content item. The received live content item is transmitted 1316 to the offset determination module 1318, where an offset is determined. The received live content item and the determined offset are transmitted 1320 to the second encoding and packaging module 1322, where the received live content item is encoded into a second bitstream and is packaged into a second plurality of segments, with the first segment of the second plurality of segments starting at a second time in the live content item, wherein the second time is based on the offset, and is after the first time. The output circuitry receives 1324, 1326, the first or second bitstream from the respective first encoding and packaging module 1314 or the second encoding and packaging module 1322 depending on when the request for the bitstream is received, and which bitstream gives rise to the lowest latency. On receiving the first or second bitstream, the received bitstream is output by the bitstream output module 1330.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be illustrative and not limiting. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:

receiving, at a computing device, a live content item;

encoding, using a first encoder, at least a first portion of the live content item into a first bitstream;

packaging, using a packager, the first bitstream into a first plurality of segments, wherein the first segment of the first plurality of segments starts at a first time in the live content item;

determining, based on a predefined factor, an offset;

encoding, using a second encoder, at least a second portion of the live content item into a second bitstream; and packaging, using the packager, the second bitstream into a second plurality of segments, wherein:

each segment of the first plurality of segments and the second plurality of segments starts with an instantaneous decoder refresh frame;

each segment at a corresponding position in the first plurality of segments and the second plurality of segments comprises a group of pictures; and the first segment of the second plurality of segments starts at a second time in the live content item, wherein the second time is based on the offset and is after the first time.

2. The method of claim 1, wherein the method further comprises:

identifying, based on the offset, a plurality of additional encoders to encode parts of the live content item into a corresponding plurality of bitstreams; and packaging, using the packager, each bitstream comprising a corresponding plurality of segments, wherein:

each segment of each corresponding plurality of segments starts with an instantaneous decoder refresh frame;

each segment at a corresponding position in the first plurality of segments and in each corresponding plurality of segments comprises a group of pictures; and the first segment of each corresponding plurality of segments starts after the second time.

3. The method of claim 1, wherein:

each segment comprises a plurality of fragments;

each fragment of each segment of the first plurality of segments and each fragment of each segment of the second plurality of segments starts with an instantaneous decoder refresh frame;

each fragment at a corresponding position in the first plurality of segments and the second plurality of segments comprises a group of pictures; and a first fragment of the first segment of the second plurality of segments starts, based on the offset, after the first time.

4. The method of claim 1, wherein the method further comprises:

receiving, at the computing device, a request to receive the live content item;

identifying a third time at which the request was received;

identifying a fourth time at which a next instantaneous decoder refresh frame of the first bitstream is available;

identifying a fifth time at which a next instantaneous decoder refresh frame of the second bitstream is available;

calculating a first difference between the third time and the fourth time;

calculating a second difference between the third time and the fifth time;

identifying which of the first difference and the second difference is smaller; and selecting the respective first bitstream or second bitstream associated with the smaller difference; and responding to the request with the selected respective first bitstream or second bitstream.

5. The method of claim 1, wherein the first bitstream and the second bitstream are encoded at a first bitrate, and the method further comprises:

encoding, using a third encoder, at least a third portion of the live content item into a third bitstream;

packaging, using the packager, the third bitstream into a third plurality of segments, wherein the third bitstream corresponds to the first bitstream and is encoded at a second bitrate, wherein the first and second bitstreams are different;

encoding, using a fourth encoder, the live content item into a fourth bitstream; and packaging, using the packager, the fourth bitstream into a fourth plurality of segments, wherein the fourth bitstream corresponds to the second bitstream and is encoded at the second bitrate.

6. The method of claim 1, wherein the computing device is a first computing device, and the method further comprises:

transmitting, from the first computing device to a second computing device, a segment from the first plurality of segments;

identifying a low bandwidth condition associated with the second computing device; and transmitting, to the second computing device, a request to disable one or more interactive features associated with a media player at the second computing device.

7. The method of claim 1, wherein the group of pictures comprises the instantaneous decoder refresh frame and one or more P-frames.

8. The method of claim 1, wherein the first bitstream and the second bitstream comprise a moof box after every frame.

9. The method of claim 1, wherein the offset is based on a target latency.

10. The method of claim 1, wherein the offset is based on a target bandwidth of the first bitstream and the second bitstream.

11. A system comprising:

input/output circuitry configured to:

receive, at a computing device, a live content item; and processing circuitry configured to:

encode, using a first encoder, at least a first portion of the live content item into a first bitstream;

package, using a packager, the first bitstream into a first plurality of segments, wherein the first segment of the first plurality of segments starts at a first time in the live content item;

determine, based on a predefined factor, an offset;

encode, using a second encoder, at least a second portion of the live content item into a second bitstream; and package, using the packager, the second bitstream into a second plurality of segments, wherein:

each segment of the first plurality of segments and the second plurality of segments starts with an instantaneous decoder refresh frame;

each segment at a corresponding position in the first plurality of segments and the second plurality of segments comprises a group of pictures; and the first segment of the second plurality of segments starts at a second time in the live content item, wherein the second time is based on the offset and is after the first time.

12. The system of claim 11, wherein the processing circuitry is further configured to:

identify, based on the offset, a plurality of additional encoders to encode parts of the live content item into a corresponding plurality of bitstreams; and packaging, using the packager, each bitstream comprising a corresponding plurality of segments, wherein:

each segment of each corresponding plurality of segments starts with an instantaneous decoder refresh frame;

each segment at a corresponding position in the first plurality of segments and in each corresponding plurality of segments comprises a group of pictures; and the first segment of each corresponding plurality of segments starts after the second time.

13. The system of claim 11, wherein:

each segment comprises a plurality of fragments;

each fragment of each segment of the first plurality of segments and each fragment of each segment of the second plurality of segments starts with an instantaneous decoder refresh frame;

each fragment at a corresponding position in the first plurality of segments and the second plurality of segments comprises a group of pictures; and a first fragment of the first segment of the second plurality of segments starts, based on the offset, after the first time.

14. The system of claim 11, wherein the system further comprises processing circuitry configured to:

receive, at the computing device, a request to receive the live content item;

identify a third time at which the request was received;

identify a fourth time at which a next instantaneous decoder refresh frame of the first bitstream is available;

identify a fifth time at which a next instantaneous decoder refresh frame of the second bitstream is available;

calculate a first difference between the third time and the fourth time;

calculate a second difference between the third time and the fifth time;

identify which of the first difference and the second difference is smaller; and select the respective first bitstream or second bitstream associated with the smaller difference; and respond to the request with the selected respective first bitstream or second bitstream.

15. The system of claim 11, wherein the first bitstream and the second bitstream are encoded at a first bitrate, and the system further comprises processing circuitry configured to:

encode, using a third encoder, at least a third portion of the live content item into a third bitstream;

package, using the packager, the third bitstream into a third plurality of segments, wherein the third bitstream corresponds to the first bitstream and is encoded at a second bitrate, wherein the first and second bitstreams are different;

encode, using a fourth encoder, the live content item into a fourth bitstream; and package, using the packager, the fourth bitstream into a fourth plurality of segments, wherein the fourth bitstream corresponds to the second bitstream and is encoded at the second bitrate.

16. The system of claim 11, wherein the computing device is a first computing device, and the system further comprises processing circuitry configured to:

transmit, from the first computing device to a second computing device, a segment from the first plurality of segments;

identify a low bandwidth condition associated with the second computing device; and transmit, to the second computing device, a request to disable one or more interactive features associated with a media player at the second computing device.

17. The system of claim 11, wherein the group of pictures comprises the instantaneous decoder refresh frame and one or more P-frames.

18. The system of claim 11, wherein the first bitstream and the second bitstream comprise a moof box after every frame.

19. The system of claim 11, wherein the offset is based on a target latency.

20. The system of claim 11, wherein the offset is based on a target bandwidth of the first bitstream and the second bitstream.

\* \* \* \* \*